(12) United States Patent
Ye et al.

(10) Patent No.: US 10,533,895 B2
(45) Date of Patent: Jan. 14, 2020

(54) APPARATUS, SYSTEMS, AND METHODS FOR TALBOT SPECTROMETERS

(71) Applicant: Massachusetts Institute of Technology, Cambridge, MA (US)

(72) Inventors: Erika Ye, Saratoga, CA (US); Amir H. Atabaki, Brookline, MA (US); Ningren Han, Cambridge, MA (US); Rajeev J. Ram, Arlington, MA (US); William F. Herrington, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/244,207

(22) Filed: Jan. 10, 2019

(65) Prior Publication Data

US 2019/0323892 A1 Oct. 24, 2019

Related U.S. Application Data

(63) Continuation of application No. 15/254,855, filed on Sep. 1, 2016, now Pat. No. 10,215,639.

(60) Provisional application No. 62/290,120, filed on Feb. 2, 2016, provisional application No. 62/213,158, filed
(Continued)

(51) Int. Cl.
*G01J 3/28* (2006.01)
*G01J 3/453* (2006.01)
*G01J 3/02* (2006.01)

(52) U.S. Cl.
CPC .............. *G01J 3/453* (2013.01); *G01J 3/0256* (2013.01); *G01J 3/0259* (2013.01); *G01J 3/4531* (2013.01); *G01J 3/4532* (2013.01)

(58) Field of Classification Search
CPC ........ G01J 3/453; G01J 3/0256; G01J 3/0259; G01J 3/4531; G01J 3/4532; G01J 3/28; G01J 3/26; G01J 3/02; G01J 3/10; G01J 3/18; G01J 3/44; G01B 11/25; G01N 21/65; G01N 21/47
See application file for complete search history.

(56) References Cited

U.S. PATENT DOCUMENTS

| 6,525,815 B2 | 2/2003 | Kung et al. |
| 10,215,639 B2 | 2/2019 | Ye et al. |
| 2002/0126279 A1 | 9/2002 | Kung et al. |

(Continued)

OTHER PUBLICATIONS

Bao et al., "A colloidal quantum dot spectrometer," Nature, vol. 523, pp. 67-70, (Jul. 2, 2015).
(Continued)

*Primary Examiner* — Abdullahi Nur
(74) *Attorney, Agent, or Firm* — Smith Baluch LLP

(57) ABSTRACT

A non-paraxial Talbot spectrometer includes a transmission grating to receive incident light. The grating period of the transmission grating is comparable to the wavelength of interest so as to allow the Talbot spectrometer to operate outside the paraxial limit. Light transmitted through the transmission grating forms periodic Talbot images. A tilted detector is employed to simultaneously sample the Talbot images at various distances along a direction perpendicular to the grating. Spectral information of the incident light can be calculated by taking Fourier transform of the measured Talbot images or by comparing the measured Talbot images with a library of intensity patterns acquired with light sources having known wavelengths.

15 Claims, 17 Drawing Sheets

Related U.S. Application Data on Sep. 2, 2015, provisional application No. 62/212,636, filed on Sep. 1, 2015.

(56) References Cited

U.S. PATENT DOCUMENTS

| | | |
|---|---|---|
| 2003/0058452 A1 | 3/2003 | Morris et al. |
| 2007/0211995 A1 | 9/2007 | Christensen et al. |
| 2012/0091372 A1 | 4/2012 | Molnar et al. |
| 2012/0267515 A1 | 10/2012 | Wu et al. |
| 2015/0066377 A1 | 3/2015 | Parchen et al. |
| 2017/0074644 A1* | 3/2017 | Arieli .................. G01N 21/4795 |

OTHER PUBLICATIONS

Bomzon et al., "Polarization Talbot self-imaging with computer-generated, space-variant subwavelength dielectric gratings," Applied Optics, vol. 41, No. 25, pp. 5218-5222 (Sep. 1, 2002).

De Nicola et al., "Talbot self-image effect in digital holography and its application to spectrometry," Optics Letters, vol. 29, No. 1, pp. 104-106 (Jan. 1, 2004).

Gan et al., "A high-resolution spectrometer based on a compact planar two dimensional photonic crystal cavity array," Applied Physics Letters, 100, 231104, 5 pages, (Jun. 4, 2012).

Gehm et al., "Static twodimensional aperture coding for multimodal, multiplex spectroscopy," Appl. Opt., vol. 45, No. 13, pp. 2965-2974 (May 1, 2006).

Guérineau et al., "Talbot experiment re-examined: study of the chromatic regime and application to spectrometry," Opt. Express, vol. 11 (24), pp. 3310-3319 (Dec. 1, 2003).

International Search Report and Written Opinion issued by the International Searching Authority for International Application No. PCT/US2016/49960, dated Dec. 5, 2016, 10 pages.

Kung et al., "Transform spectrometer based on measuring periodicity of Talbot self-images," Optics Letters, vol. 26, Issue 21, pp. 1645-1647 (2001).

Kung, "Miniaturized Optical Wavelength Sensors." Stanford University, Mar. 2003 (Mar. 2003), pp. 99, 107,117.

Le Coarer et al., "Wavelength-scale stationarywave integrated Fourier-transform spectroscopy," Nature Photonics 1,473-478 (2007).

Lohmann "A new Fourier-spectrometer consisting of a two grating interferometer," in Proc. of Conference on Optical Instruments and Techniques, London, pp. 58-61 (1961).

Lokshin et al., "On the Spectra Selectivity of Talbot and Lau Effects," Geometical and Applied Optics, Optics and Spectroscopy, vol. 82, No. 2, pp. 312-317, (Nov. 2, 2000).

Manzardo et al., "Miniature lamellar grating interferometer based on silicon technology," Optics Letters 29, Issue 13, pp. 1437-1439 (2004).

Momeni et al., "Integrated photonic crystal spectrometers for sensing applications," Optics Communications, 282 (15):3168-3171 (2009).

Redding et al., "All-fiber spectrometer based on speckle pattern reconstruction," Opt. Express, vol. 21, No. 5, pp. 6584-6600 (Mar. 8, 2013).

Redding et al., "Compact spectrometer based on a disordered photonic chip," Articles, Nature Photonics, vol. 7, pp. 746-751 (2013).

Redding et al., "Using a multimode fiber as a high-resolution, low-loss spectrometer," Optics letters, vol. 37, No. 16, pp. 3384-3386 (Aug. 15, 2012).

Wang et al., "Computational spectrometer based on a broadband diffractive optic," Opt. Express, vol. 22, No. 12, pp. 14575-14587 (Jun. 16, 2014).

Xu et al., "Multimodal multiplex spectroscopy using photonic crystals," Optics express, vol. 11, No. 18, pp. 2126-2133 (Apr. 18, 2003).

Y. Cohen-Sabban and D. Joyeux,"Aberration-free nonparaxial self-imaging" Oct. 29, 1982 Opt Soc. pp. 707-719.

Ye et al., "Miniature, sub-nanometer resolution Talbot spectrometer." Optic Letters vol. 41, No. 11, Jun. 1, 2016 (Jan. 6, 2016), pp. 1-4.

Yi Hua,"Talbot effect beyond the paraxial limit at optical frequencies", Jun. 12, 2012, Optics Express. pp. 14284-14291.

\* cited by examiner

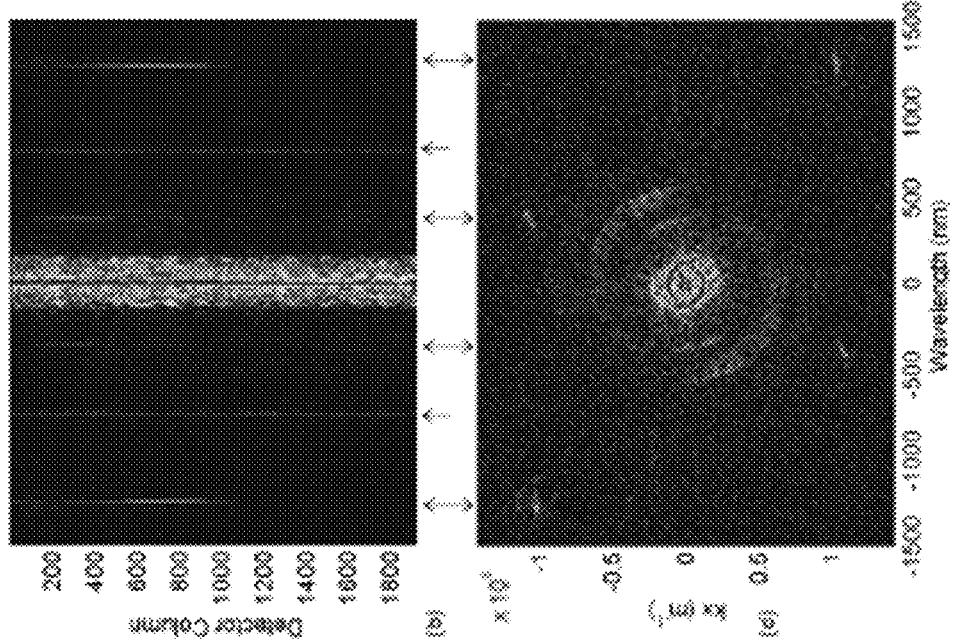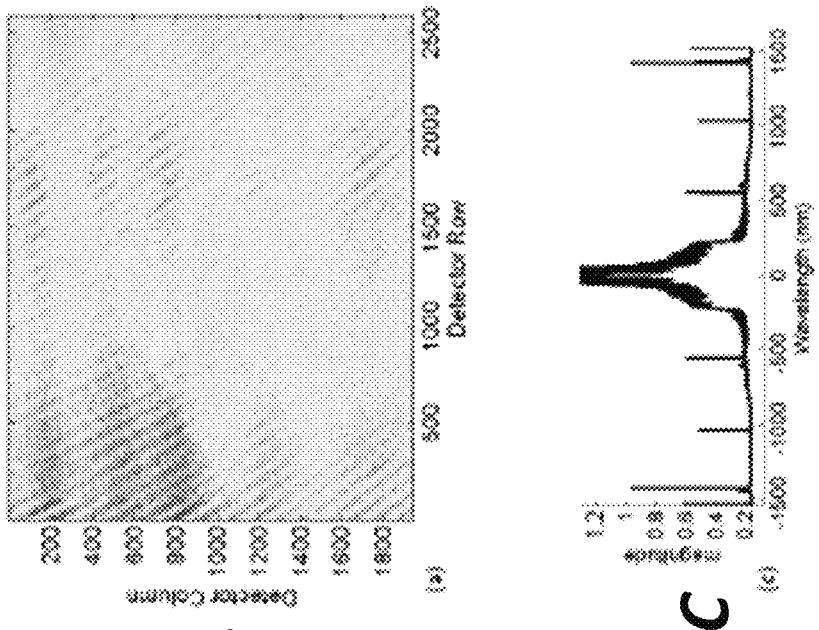
FIG. 8A  FIG. 8B  FIG. 8C  FIG. 8D

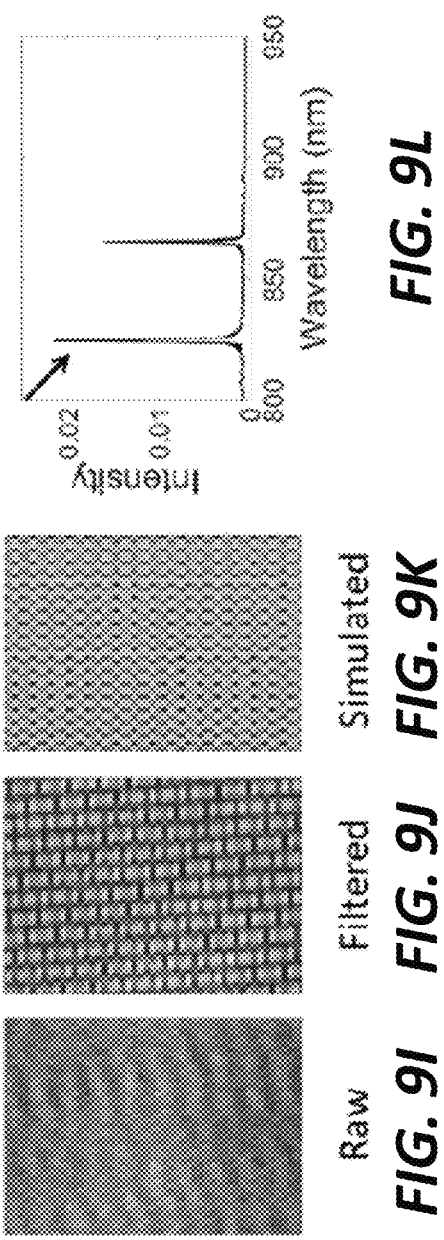
FIG. 9I Raw   FIG. 9J Filtered   FIG. 9K Simulated   FIG. 9L

APPARATUS, SYSTEMS, AND METHODS FOR TALBOT SPECTROMETERS

CROSS-REFERENCES TO RELATED APPLICATIONS

This application is a continuation of U.S. application Ser. No. 15/254,855, filed Sep. 1, 2016, and entitled "Apparatus, Systems, and Methods for Talbot Spectrometers," which in turn claims priority, under 35 U.S.C. 119(e), to: U.S. Application No. 62/212,636, filed Sep. 1, 2015, entitled "MINIATURE SPECTROMETER BASED ON MID-FIELD DIFFRACTION IMAGING"; U.S. Application No. 62/213,158, filed Sep. 2, 2015, entitled "MINIATURE SPECTROMETER BASED ON MID-FIELD DIFFRACTION IMAGING"; and U.S. Application No. 62/290,120, filed Feb. 2, 2016, entitled "MINIATURE, SUB-NANOMETER RESOLUTION TALBOT SPECTROMETER." Each of these applications is hereby incorporated herein by reference in its entirety.

BACKGROUND

Conventional free-space optical spectrometers usually rely on the dispersion properties of diffractive elements, such as gratings, to separate optical frequencies in the far-field. However, in order to achieve high spectral resolution, the spectrometer typically has a very large size or a small input aperture that spatially constricts the input light. Therefore, there can be a trade-off between resolution, size, and "light-gathering capability" (also referred to as étendue), which is proportional to the effective area of the aperture and the square of the numerical aperture.

One way to overcome the above constraints uses on-chip spectrometers, which can have lateral dimensions on the order of hundreds of microns and are very high resolution. But these on-chip spectrometers tend to suffer from low étendue due to their small input apertures.

Another way uses many filters to spectrally resolve the input signal. For example, one can use narrow-band resonant filters to achieve high resolution, or use broadband filters and employ spectral reconstruction techniques to resolve features smaller than the bandwidth of the filters.

A third approach that may address the trade-off between throughput and resolution for conventional diffractive spectrometers is to replace the small input aperture with a so-called "coded aperture," which allows for an increase in throughput. But this approach usually also includes solving an inverse computational problem to construct the spectrum, which can be complex.

SUMMARY

Apparatus, systems, and methods described herein are generally related to spectrometers using Talbot effect in non-paraxial regime. In one example, a spectrometer includes a grating to diffract incident radiation so as to form a plurality of Talbot images at intervals along a direction perpendicular to the grating. The grating has a grating period d about 1 to about 3 times larger than a wavelength $\lambda$ of the incident radiation. The spectrometer also includes a detector array, disposed at an angle with respect to the grating, to detect at least a portion of the plurality of Talbot images.

In another example, a method of spectrum analysis includes transmitting incident radiation through a grating to generate a plurality of Talbot images. The grating has a grating period about 1 to about 3 times greater than a wavelength of the incident radiation. The method also includes detecting the Talbot images with a detector array tilted with respect to the grating and estimating the wavelength based at least in part on the plurality of Talbot images.

In yet another example, a spectrometer includes a grating to diffract incident radiation so as to form a plurality of Talbot images at intervals along a direction perpendicular to the grating. The grating has a grating period d about 1 to about 3 times greater than a wavelength $\lambda$ of the incident radiation. The spectrometer also includes a detector array, disposed at an angle with respect to the grating, to detect at least a portion of the plurality of Talbot images. The detector array has a proximal end and a distal end. The proximal end is less than 1 mm away from the grating and the distal end is less than 10 mm away from the grating. The detector array also has a pixel pitch substantially equal to $(2m+1)d/2$, where m is a positive integer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 8A-8D illustrate the data processing of experimental results acquired by a Talbot spectrometer.

FIGS. 9A-9L show raw images, bandpass filtered images, simulated images, and corresponding spectra acquired with a Talbot spectrometer at different tilt angles between the detector array and the grating.

DETAILED DESCRIPTION

Talbot Spectrometers Operating In Non-Paraxial Regime

To address the challenges in conventional spectrometers, apparatus, systems, and methods described herein employ the Talbot effect generated by a transmission grating to reconstruct spectral information of the light incident on the transmission grating. An example Talbot spectrometer includes a transmission grating to receive incident light. The grating period of the transmission grating is comparable to the wavelength of interest so as to allow the Talbot spectrometer to operate outside the paraxial limit. Light transmitted through the transmission grating forms a light field including periodic diffraction patterns (also referred to as Talbot images or self-images in this application). The Talbot spectrometer also includes a tilted detector that can simultaneously measure the light field at various distances. Spectral information of the incident light can be calculated by taking Fourier transform of the measured light field or by comparing the measured diffraction patterns with a library of intensity patterns acquired with light sources having known wavelengths.

The detector in the Talbot spectrometer is placed very close to the transmission grating (e.g., less than 10 mm away from the grating) to measure the mid-field diffraction pattern and therefore the entire system can be significantly miniaturized. The short distance between the transmission grating and the detector can also allow the Talbot spectrometer to measure spectra with low temporal coherence. In other words, the spectrometer described herein relaxes the requirement of temporal coherence of incident light. In addition, the pixel pitch of the detector can be further configured to be an odd multiple of half of the grating period so as to improve effectiveness of measuring the Talbot images.

Figure 1A:
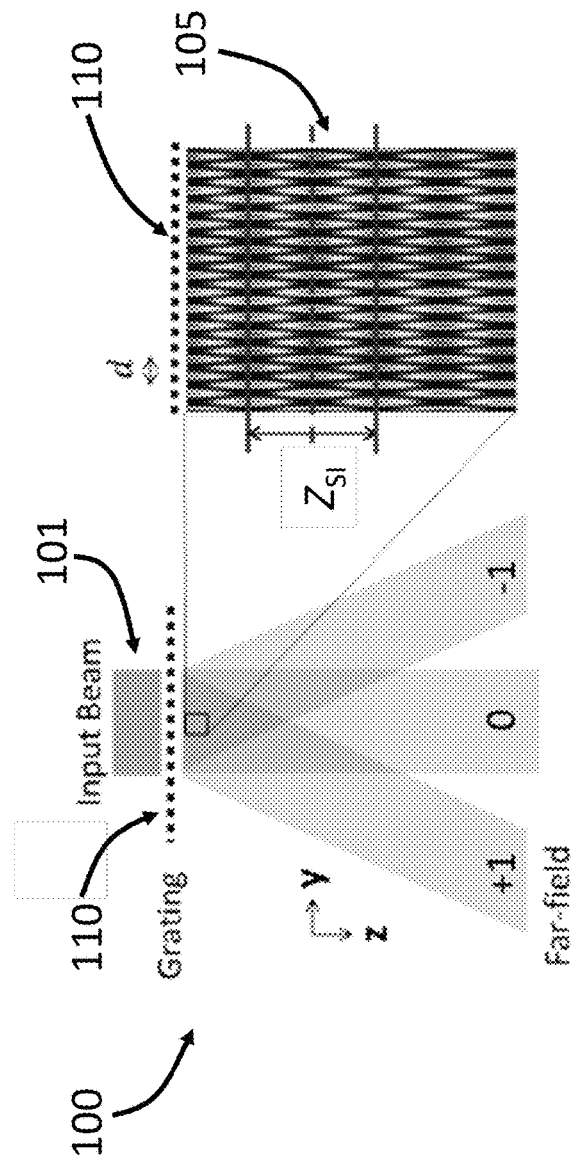
FIGS. 1A and 1B show a top view and a side view, respectively, of a spectrometer employing Talbot effect outside the paraxial limit.
Figure 1B:
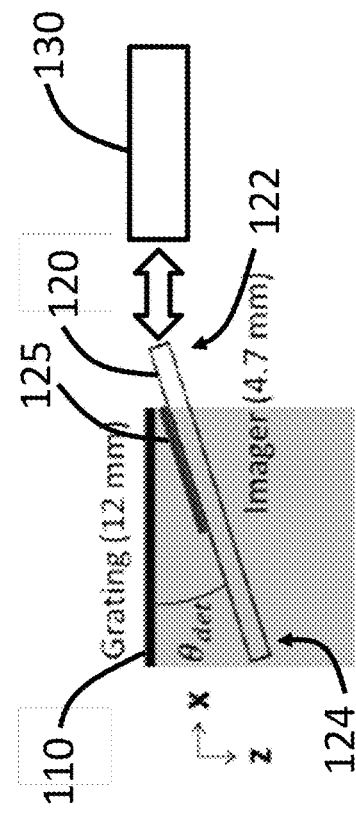

FIGS. 1A and 1B show a top view and a side view, respectively, of a Talbot spectrometer 100 operating in non-paraxial regime. The spectrometer 100 includes a grating 110 (e.g., a 1D binary transmission grating) to receive input beam 101. The input beam 101 can be, for example, emitted, scattered, or diffused from a target (also referred to as a light source). Upon diffraction by the grating 110, the incident light 101 forms a light field including multiple Talbot images 105 (also referred to as self-images 105). The grating 110 has a grating period d and is positioned such that its grooves are aligned with the y-axis and the incident light 101 propagates along the z-axis. The Talbot images 105 are located in the mid-field diffraction patterns. In addition, the Talbot images 105 are periodic in the x-direction having a period d (the same as the grating period d), constant in the y-direction, and periodic in the z-direction with period $z_{ST}$. A detector array 120 (e.g., a 2-D imager) with a pixel pitch p is tilted along the z-axis at an angle $\theta_{det}$ with respect to the y-axis, as shown in FIG. 1B. The detector array 120 is used to sample the Talbot images 105 at various locations in the z direction. In operation, the detector 120 can use only a portion 125 of the pixels for measurement. A processor 130 is operably coupled to the detector array 120 to calculate the spectrum of the incident light 101 based on the Talbot images 105 sampled by the detector 120.

Figure 1C:
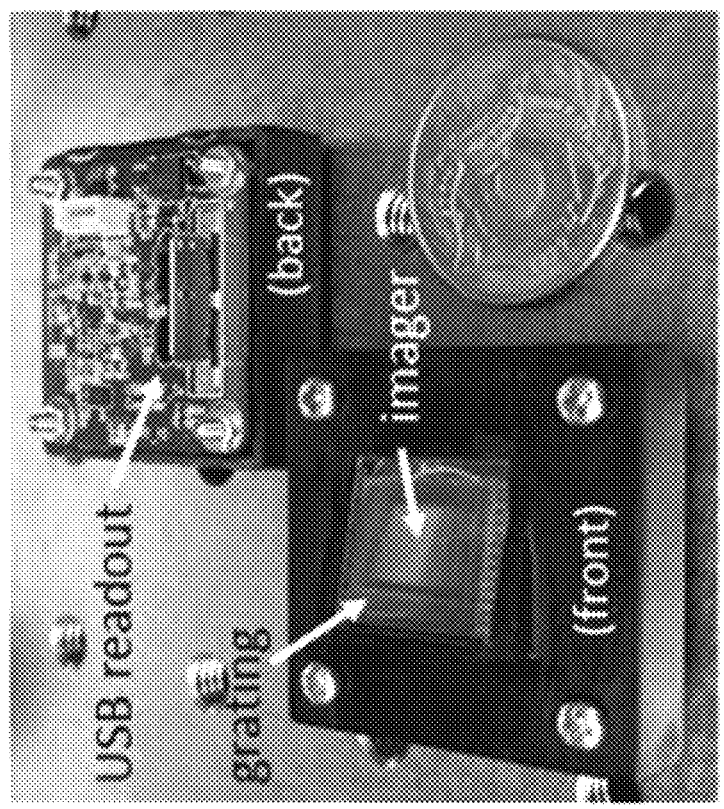
FIG. 1C is a photo of the spectrometer shown in FIGS. 1A and 1B.

FIG. 1C is a photo of the spectrometer 100 shown in FIGS. 1A-1B. To illustrate the compactness of the device, a quarter dollar is placed beside the spectrometer for comparison. The spectrometer has dimensions of about 10 mm×10 mm×6 mm and can achieve sub-nanometer resolution. In contrast, existing Talbot spectrometers usually have resolutions of about 20 nm to about 50 nm and the sizes may be as large as tens of centimeters, due to the many optical elements in the holographic system. Smaller sizes (e.g., about 40 mm) are also possible when a lens is used to magnify the self-images onto a detector.

Without being bound by any particular theory, the operation of the spectrometer 100 can be understood using Fresnel diffraction principles. As understood in the art, Fresnel diffraction from the grating 120 can generate a periodic pattern of Talbot images 105, which are observable starting immediately behind the grating 120. Halfway between the self-imaging planes are the phase-inverted imaging planes, at which the light and dark regions are swapped (see, e.g., the dashed line shown in FIG. 1A). Therefore, the intensity for a point at position (x, y) can alternate from bright to dark as one moves away from the grating 120 in z direction. Without being bounded by any particular theory or mode of operation, this repeating pattern arises from the interference from the diffracted beams. For weakly dispersive gratings, which satisfy the paraxial approximation, d>>λ, the self-images appear at Talbot image planes spaced apart by the Talbot distance $z_T$, $$z_T = m \frac{2d^2}{\lambda}, \quad (1)$$

where m is an integer corresponding to the interfering diffraction orders, λ is the operating wavelength, and d is the period of the diffraction grating. The distance within which the Talbot effect can be observed is W/tan φ, where W is the width of the grating 120 and φ is the angle of the diffracted beam. The region beyond this distance after the grating is usually referred to as the far-field regime, where the diffracted beams no longer overlap.

Since the repeating pattern of the Talbot images 105 is inversely proportional to the wavelength, the Talbot images 105 can be used to perform spectral reconstruction. The Talbot spectrometer 100 can utilize the Talbot effect by measuring the field intensity as a function of distance from the grating 110 at several Talbot image planes simultaneously. The spectrum of the incident light 101 can be then reconstructed by taking Fourier transform of the periodic pattern. Alternatively, the distance from the grating 110 can also be used to derive the wavelength.

To avoid using moving parts to measure the field, digital holography can be employed to construct the Talbot pattern or a tilted detector (as used in the spectrometer 100) can be used to simultaneously measure the field at various distances.

The spectrometer 100 shown in FIGS. 1A-1B uses a tilted detector array 120 that allows the sampling of the diffraction pattern 105 at multiple Talbot image planes along the z direction without moving parts. The spectrum can be obtained by taking the fast Fourier transform (FFT) of the detected Talbot pattern 105. The length of each pixel in the z direction is $z_{pix}=p \sin \theta_{det}$, and the total distance in z that the imager spans is $z_{spec}=N_z z_{pix}$, where $N_z$ is the number of pixels in one dimension of the imager. When $z_{pix} \ll z_T$, the pixels can be modeled as delta functions sampling the Talbot images 105, and the spectrometer's resolution and wavelength span are $\Delta k_T = 2\pi/z_{spec}$ and $k_{T,max} = \pi/z_{pix}$, respectively, where $k_T = 2\pi/z_T$.

There can be a trade-off between wavelength span and resolution of the spectrometer 100 for a given detector array 120. On the one hand, increasing the tilt angle of the detector array 120 can increase the spectrometer's resolution because the number of self-images sampled is increased. On the other hand, increasing the tilt angle can also decrease the maximum wavelength that can be detected before aliasing occurs because the sampling period is increased.

Conventional Talbot spectrometers only use the Talbot effect under the paraxial limit, where the grating period d is much larger than the operating wavelength λ (i.e., d≫λ). This may allow the acquisition of sharp replications of the grating self-images. However, operation in the paraxial limit can constrain the minimum size of the resulting spectrometer. In the paraxial limit, the Talbot distance is usually at least a hundred times larger than the wavelength. Spectral reconstruction using FFT usually uses many periods of the Talbot self-images that are sampled by the imager for high spectral resolution. To resolve wavelengths δλ apart, the minimum distance that the imager samples is approximately $2d^2/\delta\lambda$, according to Fourier theory. For example, a spectrometer with grating period d=10λ operating at λ=500 nm can be at least 5 cm long to have a spectral resolution of 1 nm.

In contrast, the grating 110 has a period d comparable to the operating wavelength λ, i.e., d~λ, in which case there is significantly diffracted power in only the +1, 0, and −1 diffraction orders. This case is referred to as non-paraxial regime throughout this application. The Talbot images 105 may not be sharp replicas of the pattern of the grating 110. Instead, the Talbot images include smooth sinusoids (see, e.g., FIG. 1A), and appear periodically in z with period:

$$z_{SI} = \frac{\lambda}{1 - \sqrt{1 - \frac{\lambda^2}{d^2}}}, \quad (2)$$

The Talbot images 105 in non-paraxial regime can arise from the interference of the −1 and/or +1 diffracted beams with the 0 order diffracted beam. In the paraxial limit, Equation (2) simplifies to the Talbot distance in Equation (1).

The wavelength can be calculated from the periodicity of the self-images ($z_{SI}$) from $$\lambda = \frac{2d^2 z_{SI}}{d^2 + z_{SI}^2} \quad (3)$$

When operating in non-paraxial regime, the distance between the self-images is on the order of the wavelength, so a spectrometer of comparable resolution can be a hundred times thinner.

To further improve the performance of the non-paraxial, mid-field Talbot spectrometer, the detector array 120 can be configured to resolve the Talbot images 105 without free-space optics such as lenses. In one example, the pixel pitch p of the detector array 120 can be different from integer multiple of the grating period d, i.e., p≠nd, where n is a positive integer. Otherwise, the detector array 120 may not be able to detect the difference in intensity at the self-imaging planes and the phase-inverted self-imaging planes, and the recorded pattern may be constant in z. In another example, the Talbot signal can be increased or maximized by using a pixel pitch p that is an odd multiple of half the grating period d, i.e., p=(2m+1)d/2, where m is a positive integer.

Based on the above description, components in the spectrometer 100 can be configured accordingly. The ratio of the grating 110 period d to the wavelength λ of the incident beam 101 determines the regime of the spectrometer 100 (e.g., paraxial regime or non-paraxial regime). In one example, the ratio d/λ can be about 1 to about 3 (e.g., about 1, about 1.5, about 2, about 2.5, or about 3, including any values and sub-ranges in between). In another example, the grating period d can be less than the wavelength λ to further increase the diffraction effect (e.g., d/λ can be less than 1, less than 0.9, less than 0.8, less than 0.7, less than 0.6, less than 0.5, less than 0.4, or less than 0.3, including any values and sub-ranges in between).

In one example, the grating 110 has a constant period d across the entire grating 110. In another example, the grating 110 can have a varying period across the grating 110. For example, the period of the grating 110 can gradually change from $d_1$ on one end of the grating to $d_2$ on the other end of the grating. This varying-period grating (also referred to as a varying-pitch grating) may function as a dispersion compensator, in addition to generating the Talbot images 105.

The absolute value of the grating period d can be application specific. For example, for medical applications, the spectrometer 100 can work in the visible and near infrared (IR) regions of the electromagnetic spectrum, so the grating period d can be about 0.8 μm to about 2 μm. In another example, the spectrometer 100, when used in the short wavelength infrared (SWIR) regions\ of the electromagnetic spectrum for machine vision, the grating period d can be about 1.2 μm to about 4 μm. In practice, the grating period d can be about 0.5 μm to about 5 μm (e.g., about 0.5 μm, about 0.8 μm, about 1.0 μm, about 1.2 μm, about 1.4 μm, about 1.6 μm, about 1.8 μm, about 2 μm, about 3 μm, about 4 μm, or about 5 μm, including any values and sub-ranges in between).

The tilt angle $\theta_{det}$ of the detector 120 with respect to the grating 110 can influence the resolution of the spectrometer 100. In general, a larger tilt angle $\theta_{det}$ can lead to a higher resolution of the spectrometer 100 (see more details below). In practice, the tilt angle $\theta_{det}$ can be about 10 degrees to about 40 degrees (e.g., about 10 degrees, about 15 degrees, about 20 degrees, about 25 degrees, about 30 degrees, about 35 degrees, or about 40 degrees, including any values and sub ranges in between). Tilt angles $\theta_{det}$ greater than 40 degrees can also be used when, for example, the pixel pitch p (or the pixel size accordingly) is small (e.g., less than 1 μm).

The tilt angle $\theta_{det}$ can be configured in view of the total length L of the detector array 120. For example, the tilt angle $\theta_{det}$ and the length L of the detector 120 can be set such that the detector array 120 has a projected length along the z direction (i.e., L $\sin(\theta_{det})$) greater than the Talbot length $z_{ST}$ (see, Equation (2)) so as to sample at least one Talbot image. In practice, the projected length of the detector array 120 can be at least 3 times greater than the Talbot length (e.g., greater than 3 times, greater than 4 times, greater than 5 times, greater than 8 times, greater than 10 times, greater than 12 times, greater than 20 times, greater than 50 times, greater than 100 times, or greater than 150 times, including any values and sub ranges in between). In other words, hundreds of Talbot images can be sampled by the detector array 120.

As shown in FIG. 1B, the detector array 120 has a proximal end 122 and a distal end 124. Since Talbot images 105 can appear immediately after the grating 110, the proximal end 122 of the detector array 120 can be very close to the grating 110 (e.g., less than 2 mm, less than 1 mm, less than 0.8 mm, less than 0.7 mm, or less than 0.6 mm, including any values and sub ranges in between). The distal end 124 of the detector 120 can be about less than 15 mm away from the grating 110 (e.g., less than 15 mm, less than 12 mm, less than 10 mm, less than 9 mm, less than 8 mm, less than 7 mm, less than 6 mm, less than 5 mm, or less than 4 mm, including any values and sub ranges in between).

The Talbot images 105 shown in FIG. 1A are periodic along a direction (i.e., z direction) perpendicular to the grating 110 for illustrative purposes. In practice, the Talbot images 105 can be periodic along any direction that has a component along the normal to the grating 110.

The processor 130 in the spectrometer 100 is employed to estimate the wavelength(s) of the incident light 101. In one example, the processor 130 can perform a Fourier transform of the measured Talbot images 105 to derive the spectral information of the incident light beam 105. The Fourier transform can be a one-dimensional Fast Fourier Transform (1D-FFT) performed on the measured intensity along one column. The 2D imager also provides a means of reducing noise by averaging the spectra from multiple columns of the imager.

In another example, the processor 130 can calculate the spectral information of the incident light beam 101 using a trained model by comparing the detected Talbot images with a library of expected intensity patterns for a known range of wavelengths. The library of expected intensity patterns can be created through a calibration process. In the calibration process, light beams at a range of known wavelengths (e.g., $\lambda_1, \lambda_2, \ldots,$ to $\lambda_N$) can illuminate the grating 110 and the corresponding intensity patterns (e.g., $I_1, I_1, \ldots,$ to $I_N$) can be recorded by the detector 120. In operation of the spectrometer 100, when the light beam 101 at an unknown wavelength is illuminating the grating 110, the recorded pattern $I_{uk}$ can be compared to the sequence of patterns ($I_1, I_1, \ldots,$ to $I_N$) to determine which wavelength ($\lambda_1, \lambda_2, \ldots,$ to $\lambda_N$) generates similar patterns. Alternatively, given this library and the response of the spectrometer 100 from the unknown light source, the spectral composition of the light source can be determined by solving an inverse matrix problem. The library components can be at least semi-orthogonal to each other in order to be resolved with confidence.

Methods of Spectral Analysis Using Talbot Images

Figure 2:
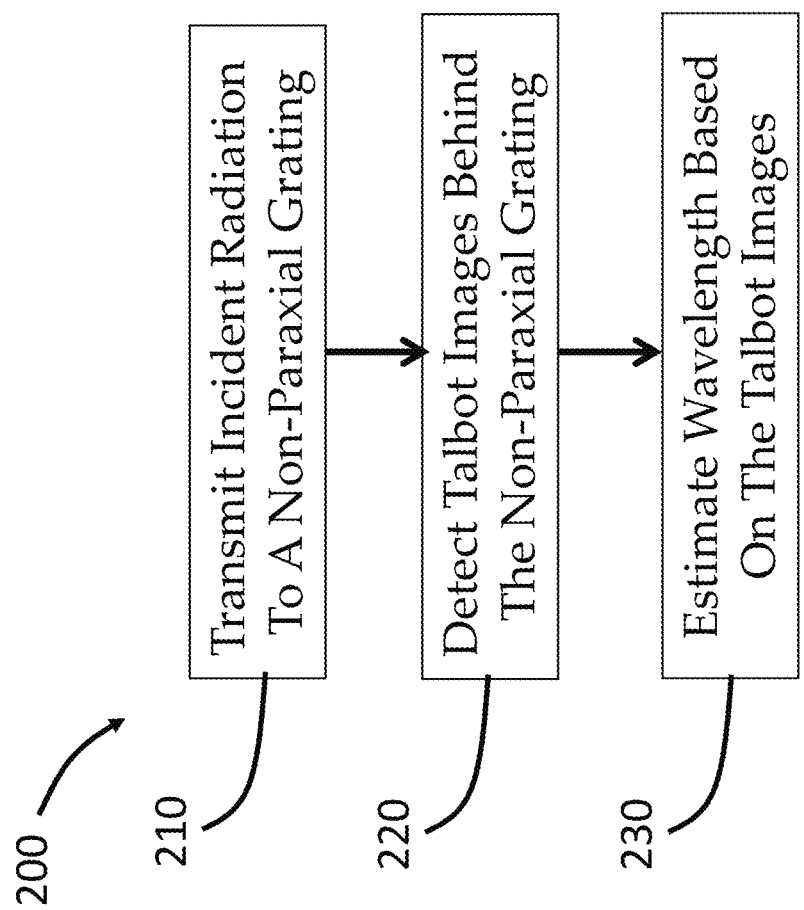
FIG. 2 illustrates a method of spectral analysis using the Talbot effect in the non-paraxial regime.

FIG. 2 illustrates a method 200 for spectral analysis using Talbot images. At step 210 in the method 200, incident radiation illuminates a non-paraxial grating that has a grating period d comparable to at least one wavelength $\lambda$ of a spectral component of the incident radiation. For example, the ratio of the grating period d to the wavelength $\lambda$ (i.e., $d/\lambda$) can be about 1 to about 3 or any other range described above. The diffraction of the grating generates multiple Talbot images periodically located after the grating along a z direction.

At step 220 of the method 200, a detector samples the Talbot images at various locations along the z direction. In one example, the detector can be substantially parallel to the grating and measure one Talbot image at one location after the grating. A moving stage can be used to move the detector along the z direction so as to sample the Talbot images (see, e.g., FIG. 3B). In another example, a detector can sample the Talbot images at various locations along the z direction by tilting the detector with respect to the grating (see, e.g., FIG. 1B). This configuration can work without a moving stage, thereby further reducing the complexity of the system.

At step 230 of the method 200, a processor estimates the spectral information (such as peak wavelength or spectral density) of the incident radiation based on the Talbot images acquired at step 220. In one example, the processor can perform a 1D-FFT to derive the spectral information. In another example, the processor can compare the acquired Talbot images with a library of expected intensity patterns to determine the wavelength(s) of spectral components in the incident radiation.

Analysis of Performance of Talbot Spectrometers in Non-Paraxial Regime

Figures 3A, 3B:
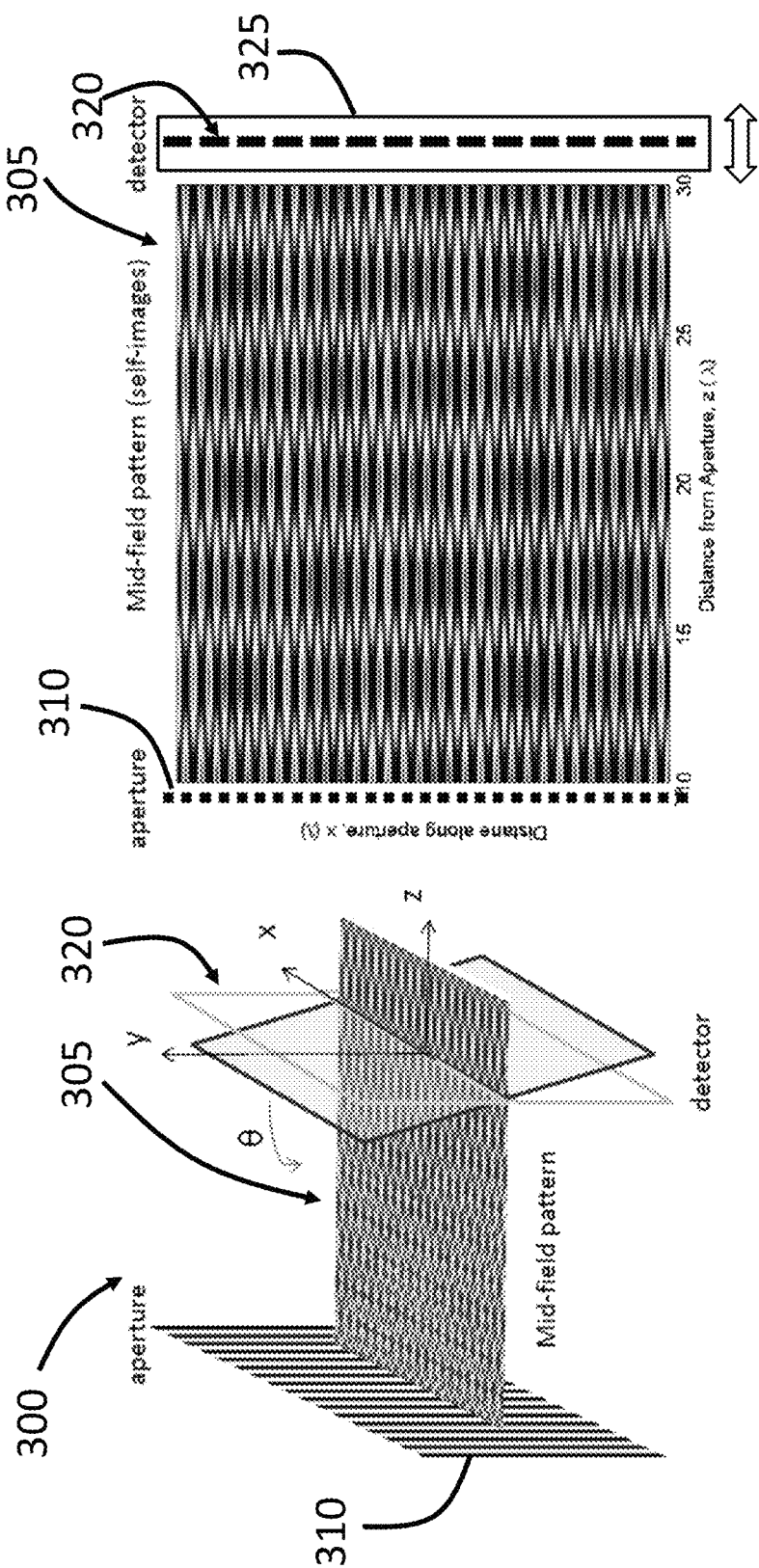
FIGS. 3A and 3B show a perspective view and a side view, respectively, of a spectrometer using a one-dimensional binary transmission grating and a detector array.

FIGS. 3A and 3B shows a perspective view and a side view, respectively, of a spectroscopic system 300 including a binary 1D transmission grating 310 to generate Talbot images 305 in the mid-field diffraction pattern. The grooves of the grating 310 are along y direction and the Talbot images 304 are periodic along z direction. A detector 320 is placed at an angle with respect to the grating 310 to sample the Talbot images 305 at various locations along the z direction. The detector 320 can be rotated about the x direction by an actuator 325, thereby allowing the analysis of spectrometer performance as a function of tilt angle. In another example, the actuator 325 can also include a moving stage (also referred to as a translation stage) to move the detector 320 along the z direction. The system 300 can also be used to investigate the influence of other parameters, such as grating periodicity, tilt angle, and incidence angle of light beams, on the performance of Talbot spectrometers operating in non-paraxial regime.

Grating Periodicity

The mid-field pattern including the Talbot images 305 behind a 1D transmission grating 310 is shown in FIG. 3B. The self-images 305 that occur every Talbot distance appear as alternating strips of high and low intensity lines, corresponding to the teeth of the grating 310. Between each of the self-images are the phase-inverted self-images, which have reversed high and low intensity lines. Therefore, when measuring the Talbot periodicity, one can only look at a single point on the along x and observe how it changes in intensity with propagation distance z.

Without being bound by any particular theory, the field behind the grating of grating periodicity d can be expressed using Lord Rayleigh's approximation of the Talbot effect as:

$$I(x, z) = |A_0|^2 + 4|A_1|^2 \cos(2\pi x/d)^2 + 4A_0 A_1 \cos\left(\frac{2\pi x}{d}\right)\cos(2\pi x/z_T) \quad (4)$$

where $A_0$ is the diffraction efficiency of the m=0 diffraction order, and $A_1$ is the diffraction efficiency of the m=1, −1 diffraction orders.

It can be assumed that the power detected by a square pixel with pixel length p is given by:

$$P_{pixel} = \int_{y_0}^{y_0+p} \int_{x_0}^{x_0+p} I(x, z) dx dy = \qquad (5)$$

$$p\left[pA_0^2 + 4A_1^2\left(\frac{p}{2} + \frac{d\sin\left(\frac{4\pi(p+x_0)}{d}\right) - d\sin\left(\frac{4\pi x_0}{d}\right)}{8\pi}\right) - \frac{dA_0A_1}{\pi}\cos(2\pi z/z_T)\left(\sin\left(\frac{2\pi x_0}{d}\right) - \sin\left(\frac{2\pi(p+x_0)}{d}\right)\right)\right]$$

The term of the equation that provides information about the Talbot distance is the $\cos(2\pi z/z_T)$ term.

At $z=z_T$, the relationship between the detected power of the Talbot effect and pixel length p is:

$$P_{pix,Talbot} = \frac{dA_0A_1}{\pi}\left(\sin\left(\frac{2\pi x_0}{d}\right) - \sin\left(\frac{2\pi(p+x_0)}{d}\right)\right) \qquad (6)$$

Note that this equation neglects the z dependence that the detector can have in the x and y direction. This z dependence can be accounted for by using $z=z_0+x\tan(\theta_{det})$ or $z=z_0+y\tan(\theta_{det})$, where $\theta_{det}$ is the angle the detector 320 is tilted with respect to the x- and/or y-axes.

In one example, when analyzing the contrast along the detector in the x-direction, the detector can be parallel to the transmission grating ($\theta_{det}=0$) and Equation (5) can be sufficient for this purpose.

First, assuming that the self-image is centered on the pixel, such that $x_0=p/2+mp$, where m is an arbitrary integer. Then, if the pixel width p is an odd multiple of half of the grating periodicity d, then the pixels measuring the Talbot self-images can see n peaks and n–1 nulls and the pixels measuring the inverted self-images can see n–1 peaks and n nulls. Note that this assumes that the peaks from the self-image are centered on the pixel. In contrast, if the pixel width is a multiple of the grating periodicity, each pixel can see n peaks and n nulls. As a result, intensity detected by each pixel may appear the same, and no Talbot distance may be measured.

In one example, it can be beneficial to set n=1, so that the pixel width is half the periodicity of the grating and each pixel measures a single peak or null. However, if the grating 310 is to only have propagating zero and first diffraction orders for wavelengths longer than 800 nm, the grating periodicity at maximum can be 1600 nm. The width of each peak or null can be approximately 800 nm, and the corresponding pixel pitch of the detector 320 is about just 800 nm, which may be challenging to fabricate.

In another example, one can set n=2, and fit 1.5 periods of the self-image onto a single pixel. This can correspond to a pixel width of at most 2400 nm, which is a reasonable size in current CMOS detectors.

It can also be beneficial to have good control over $x_0$ (i.e., the offset of the imager pixel from the Talbot pattern) by, for example, moving the image sensor in the x direction so as to increase the amplitude of the Talbot effect. On the other hand, it can be challenging to observe the Talbot effect if p is an integer multiple of d, regardless of $x_0$. In the cases when $p \neq m(d/\lambda)$, where m is an arbitrary integer, the measured amplitude of the Talbot effect can vary across the detector. This can be advantageous if precise control of the position of the grating relative to the detector is inconvenient or unavailable, because it can guarantee that some signal can be detected.

If the desired relationship between the grating 310 and pixel periodicities is not available, the grating 310 can be rotated with respect to the incident beam to reduce the effective grating periodicity to d cos θ, though this may change the diffraction efficiency of the grating.

Tilt Direction of Detector

In one example, the detector 320 can be tilted parallel to the teeth of the grating 310. In another example, the detector 320 can be tilted perpendicular to the teeth of the grating 310. It can be helpful to investigate the difference between these two configurations so as to further improve the performance of the system 300.

In FIG. 3A, the teeth of the grating 310 are oriented vertically along the y-axis and the detector 320 is rotated about the x-axis to sample the Talbot distances along each column and the grating periodicity along each row. If the detector 320 is instead tilted around the y-axis, then the detector samples the Talbot distances and grating periodicity simultaneously along each row, while no information is collected along each column. Therefore, the first option can be more attractive because the intensities at the Talbot distances are sampled independently, in which case the calculations can be simplified.

In one example, the detector 320 is rotated about the x-axis, then the y-axis of the detector 320 can sample the mid-field diffraction pattern at $z=y\tan\theta_{det}$. When $p\sin\theta_{det}\ll z_T$, the contrast of the measured Talbot signal can be comparable to the contrast derived in the previous section. As the detector tilt increases, the contrast decreases. When $p\sin\theta_{det}=z_T$, the contrast can be zero.

In another example, the detector 320 is rotated about the y-axis, then the detector 320 can sample the mid-field diffraction pattern along a line s where $s=x\cos\theta_{det}=z\sin\theta_{det}$. Therefore, when $\theta_{det}=0$, the detector can only sample along the x-axis, while when $\theta_{det}=90°$, the detector can sample along the z-axis. The effective pixel length in x is then $p_{eff}=p\cos\theta_{det}$.

The tilt can allow for the peaks and nulls of the light field to correspond to a single pixel along a row of pixels, thereby increasing the detected Talbot signal. For example, by integrating over the field at the detector 320 for each pixel, where $z=x\tan\theta_{det}$, it can be seen that depending on the tilt of the detector 320, the contrast of the signal can increase at relatively large tilts. However, unless $\theta_{det}$ is close to 0 or 90 degrees, the signal measured at the detector may not be obviously periodic as a function of the Talbot distance. (This analysis also does not account for possibly decreased detector efficiency at increased tilt angles.)

Resolution of the Talbot Spectrometer

As described above, the Fourier transform can be used to determine the spectral information, in which case the resolution of the spectrometer 300 can depend on the number of periods that the detector 320 samples. The bandwidth of the spectrometer 300 can depend on the sampling frequency, which can be approximated by the pixel pitch of the detector 320.

The detector 320 can be modeled as a finite series of delta functions. The spacing of the delta functions corresponds to the effective pixel pitch a, and the length of the series is determined by the number of pixels N, or the detector length. This model can be expressed as a train of delta functions multiplied by a large rectangle function. In the Fourier space, the system is a train of delta functions with spacing $2\pi/a$ that is convolved with a narrow sinc function. (The finite extent of each pixel produces a sinc-like apodization in the Fourier domain that can be neglected if the pixels' active areas are small enough relative to their pitch.) The sampling window can be the entire length of the detector 320. The parameter that can determine the spectral resolution is the entire sampling length (or imager length along the direction normal to the grating), and in the Fourier domain the sinc function associated with this sampling window. This sampling window can be very large, compared to the Talbot distance.

In operation, the signal on the detector 320 has a Talbot distance $z_T$. This signal is multiplied onto the detector 320 in real space, so it is convolved with the detector 320 in Fourier space. Considering a single period from $-\pi/a$ from $+\pi/a$ in the Fourier space, it is expected to see two sinc functions at the carrier frequencies $k_T = \pm 2\pi/z_T$. The bandwidth of the system can be defined as $k_T = \pi/a$ to avoid aliasing, and the resolution of this effect can be determined by the width of the sinc function.

According the Rayleigh criterion, the next resolvable peak is at the zero of the sinc function. The discrete time Fourier transform (DTFT) of a centered box with N discrete elements is $\sin(\Omega(N/2+\frac{1}{2}))/\sin(\Omega/2)$, where $\Omega = \omega a$. Therefore, the sinc has zeros at $\omega(N/2+\frac{1}{2}) = \pi/a$, and is a function of the number of pixels in each column of the detector 320.

The effective pixel length can be defined as the length of the pixel in z direction, and is equal to p sin($\theta$), where p is the actual pixel length, and $\theta$ is the angle that the detector 320 is tilted by from the vertical axis. Therefore, the resolution is:

$$\Delta k_T = \frac{2\pi}{(N+1)p\sin\theta} \quad (7)$$

And the bandwidth is:

$$k_{T,max} = \frac{\pi}{p\sin\theta} \quad (8)$$

Recall that when d>>λ, where d is the period of the grating 310, the approximation $z_T = 2d^2/\lambda$ can be made. In this case, the wavelength resolution is:

$$\Delta \lambda = \frac{2d^2}{(N+1)p\sin\theta} \quad (9)$$

It appears that the minimum resolvable feature decreases with increasing p, so a large pixel size can be desirable. This makes sense because having a longer pixel size can allow the system 300 to sample more periods of the Talbot effect. However, the pixel pitch p may be constrained by grating period d, which is in turn dependent on the operating wavelength λ. In non-paraxial regime, the grating period d is comparable to the operating wavelength λ, and the resolution can be solved numerically.

Figure 4A:
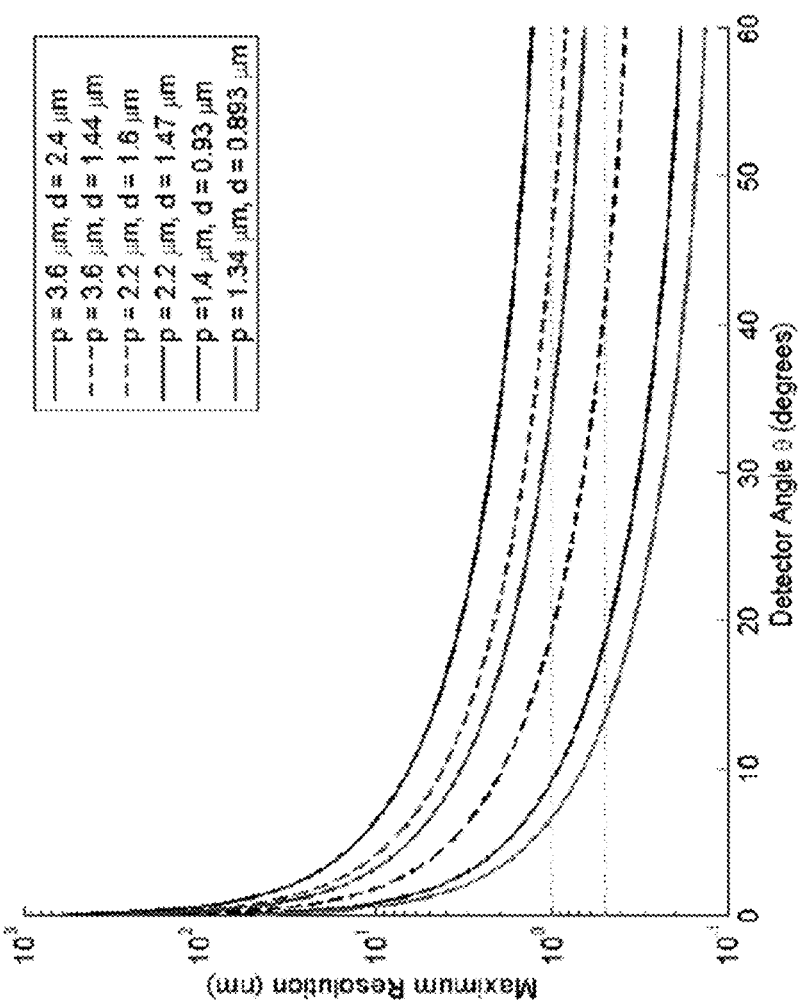
FIGS. 4A and 4B show calculated resolution and bandwidth, respectively, of Talbot spectrometers for given pixel lengths and grating periods as a function of detector angle.
Figure 4B:
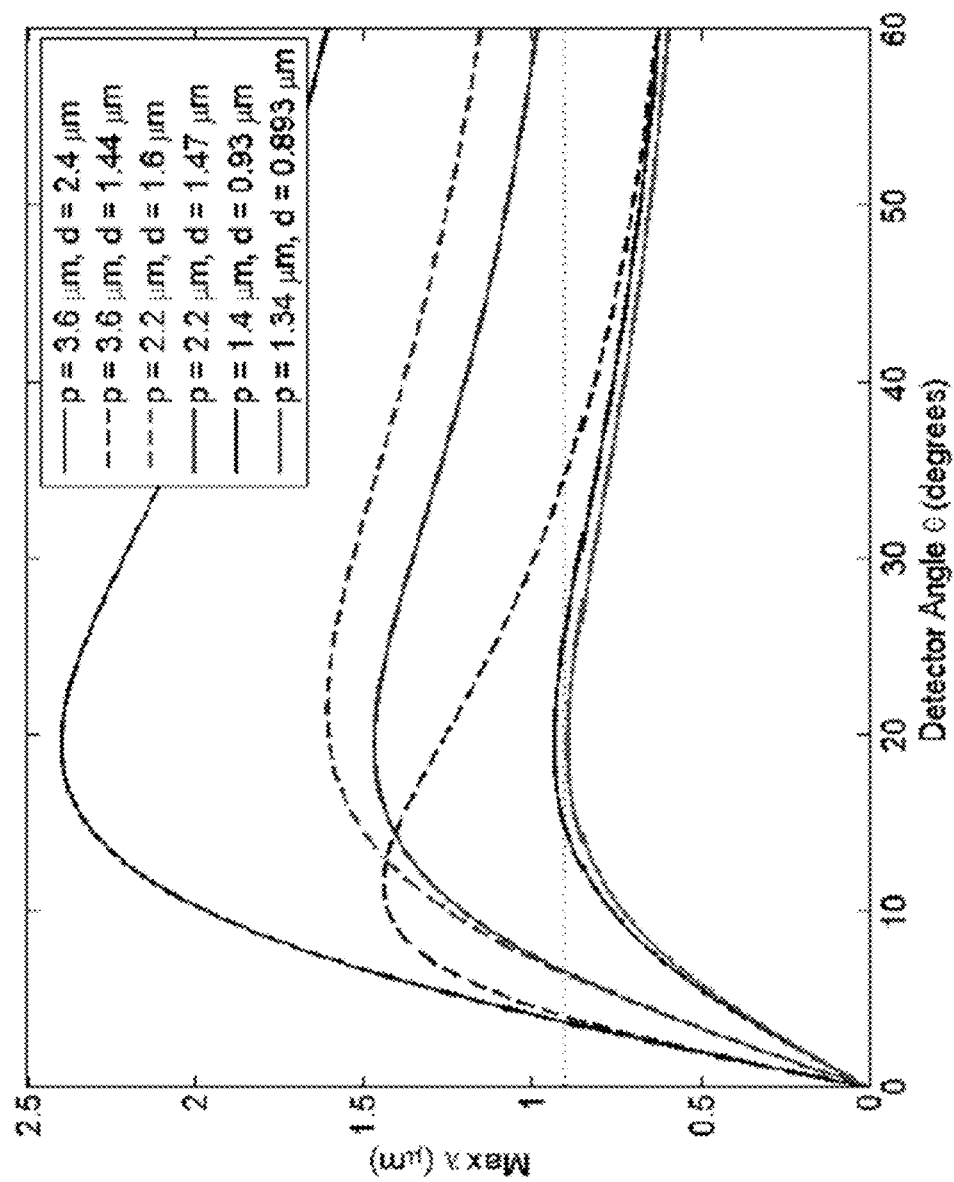

FIGS. 4A-4B show calculated resolution and bandwidth of Talbot spectrometers for given pixel length p and grating period d as a function of detector angle. In addition, the bandwidth can be solved for analytically without approximation:

$$\lambda_{max} = \frac{2d^2 z_{T,max}}{d^2 + z_{T,max}^2} = \frac{d^2 p \sin\theta}{d^2 + (p\sin\theta)^2/4} \quad (10)$$

It can be seen that sub-nanometer resolution can be readily achieved in the system 300. A bandwidth of more than 2 μm is also practical, thereby allowing the use of the system 300 in various applications involving spectral analysis in visible and infrared regions of the electromagnetic spectrum.

Using geometrical arguments, the grating size matching a detector of length L and width W can also be determined. The Talbot self-images 305 occur when the +1, 0, and -1 diffraction orders overlap. But the measurement of the Talbot distance can be more reliable where either the +1 and 0 diffraction order exist or the -1 and 0 diffraction orders exist, though the strength of the signal may be weaker.

The minimum grating size can be defined as the size for which the Talbot effect ends just at the farthest point of the detector 320. In this case, the grating size is G=2L sin($\theta$) tan($\theta_{diff}$), where $\theta_{diff}$ is the far field diffraction angle. The ideal grating size can be defined as the size for which the entire detector 320 is in the region where the +1, 0, and -1 diffraction orders all exist. In this case, the grating size is G=2(L sin $\theta$+W/(2 tan $\theta_{diff}$))tan $\theta_{diff}$. The minimum height of the grating is L cos $\theta$, though in practice it can be larger to avoid edge effects.

Using these various constraint equations, the parameters to obtain a certain resolution can be determined. Because the pixel length and grating period are closely related for optimal performance, all the constraints can be expressed in terms of pixel length.

Figure 5B:
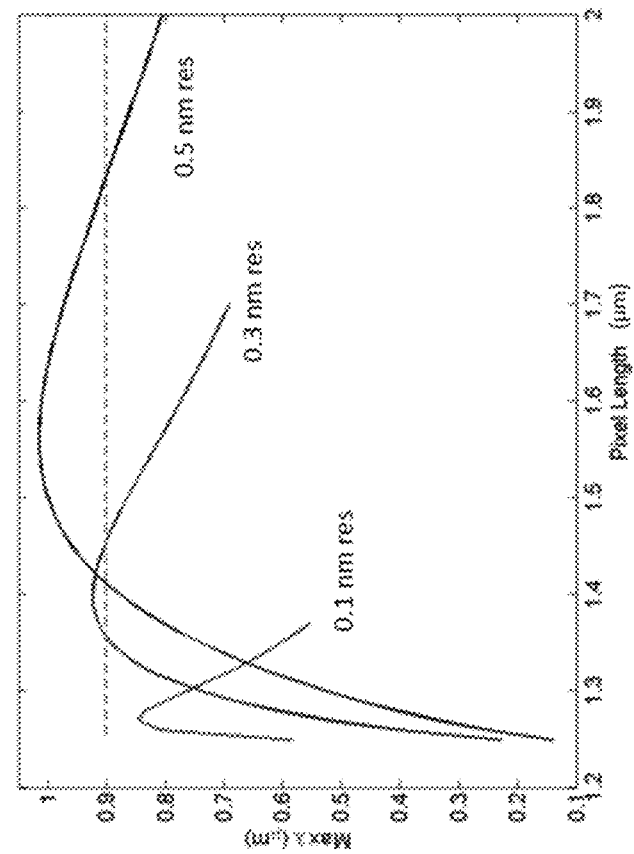
FIGS. 5A and 5B show parameter settings, including pixel length, detector angle, and bandwidth, that can be used to achieve various resolutions in the Talbot spectrometer shown in FIGS. 3A and 3B.
Figure 5A:
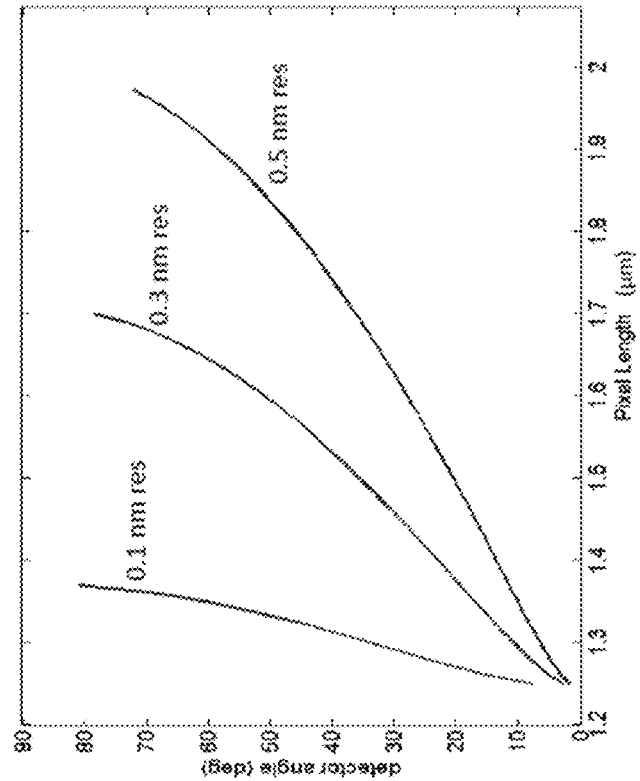

FIG. 5A shows curves relating pixel pitch to detector tilt in order to achieve different resolutions. The grating periodicity is assumed to be d=⅔p. FIG. 5B shows the corresponding bandwidth of the system with the parameters for achieving these resolutions. It can be seen that, for a given relationship between d and G, detectors with smaller pixel sizes can be used to achieve higher resolution.

Generalizing the Talbot Effect

The above analysis uses the Talbot Effect in its ideal form (e.g. plane wave incidence, symmetric binary grating). It can also be helpful to investigate the robustness of the Talbot effect including practical considerations such as asymmetric gratings and angular sensitivity.

Asymmetric Grating

The diffraction efficiency of each diffraction order m can be given by $A_m$. For an asymmetric grating, $A_1 \neq A_{-1}$. The field behind the grating where the three diffraction orders interfere is:

$$E(x,z,t)=A_0 \exp(j(\omega t-kz))+A_1 \exp(j(k_{\|,1}x))\exp(j(\omega t-k_{\perp,1}xz))+A_{-1} \exp(-j(k_{\|,1}x))\exp(j(\omega t-k_{\perp,1}xz)) \quad (11)$$

Assuming the field amplitudes $A_m$ are real, the intensity of the field is:

$$I(x,z)=A_0^2+A_1^2+A_{-1}^2+2A_1A_{-1}\cos(2k_{\|,1}x)+2A_0(A_1+A_{-1})\cos(k_{\|,1}x)\cos((k-k_{\perp,1})z)+2A_0(A_1-A_{-1})\sin(k_{\|,1}x)\sin((k-k_{\perp,1})z) \quad (12)$$

The field intensity is still periodic in z, with a period of $z_T$. For a symmetric grating as discussed above, where $A_1=A_{-1}$, the self-images remain at a constant lateral position. On the other hand, for a perfectly asymmetric grating, where $A_1$ (or $A_{-1}$) is zero while the other terms are non-zero, the self-images shift in x direction as they propagate in z direction.

To maximize the cosine term, with the constraint that $1=A_0^2+A_1^2+A_{-1}^2$, $A_0$ can be $1/\sqrt{2}$, while $A_1=A_{-1}=\frac{1}{2}$. The amplitude of the cosine is then $\sqrt{2}$, while the sine term goes to 0. The DC terms equals 1, so the ratio of the Talbot effect to the DC background is √2. To achieve this, a perfect cosine grating can be desirable.

To maximize the sine term, a perfectly asymmetric grating, with $A_0=1/\sqrt{2}$, and $A_1=1/\sqrt{2}$, and $A_{-1}=0$ can be helpful ($A_1$ ad $A_{-1}$ are interchangeable). This means that the cosine term has an amplitude of 1 and the sine term has an amplitude of 1. The DC terms also equals 1. Therefore, the measured signal from the Talbot effect can be greater with the optimal symmetric grating. However, given a non-optimized diffraction grating, the diffraction efficiencies can change depending on the angle of incidence. Talbot signal can be improved by adjusting the orientation of the angle with respect to the beam.

Angular Sensitivity

The above analysis for the Talbot Effect assumes that the incident light is a perfect plane wave. In practice, the light source might not be perfectly collimated, so it can be helpful to investigate the sensitivity of the Talbot effect with respect to the angular spread of the beam. Without being bound by any particular theory, intuition from Lord Rayleigh's derivation of the Talbot effect suggests that the self-images point in the direction of the zeroth-order diffraction beam. This can be simulated by applying a phase $\exp(-j\varphi)$ at the grating, where $\varphi$ is the angle of incidence. The simulation shows that the self-images can be tilted at an angle. In regions with higher diffraction orders, textures within the self-images can be observed.

In k-space (i.e., wave vector space), the valid combinations of the components of k for a propagating beam at a diffractive medium can be represented by the surface of a sphere, with the origin positioned at the value of the propagating k-vector. For example, if the beam is propagating with $\vec{k}=k_z\hat{z}$, then the origin is at x=0, y=0, and $z=-k_z$. For simplicity, a 2D system can be considered. In paraxial approximation, the valid solutions of k are represented by a parabola.

The grating puts a constraint on the $k_x$ values the propagating beam can have. As a result, the beam can have a particular $k_z$, which actually corresponds to the Talbot distance. However, for a beam of angled incidence on the grating, the origin of the circle can be elsewhere, and the same $k_x$ constraint may cause the diffracted beam to have two different values for $k_z$. If the incident beam has a range of angles, the diffracted beam can have a range of $k_z$, and so the Talbot images can begin to blur together, thereby rendering it challenging to extract any information from the mid-field diffraction pattern.

To better understand the behavior of the system with non-collimated light sources, the grating can be illuminated (e.g., in a simulation) with a point source some distance away, such that the grating has a certain angle of acceptance. Acceptance angle can be defined as the angle from normal incidence that the point source makes with respect to the edge of the grating. It can be further assumed that the light source is small, so that the response can be represented by a single point source. It turns out that for small acceptance angles, having multiple point sources does not affect the detected pattern significantly, since the phase front at the grating looks approximately the same for each point source.

Figure 6B:
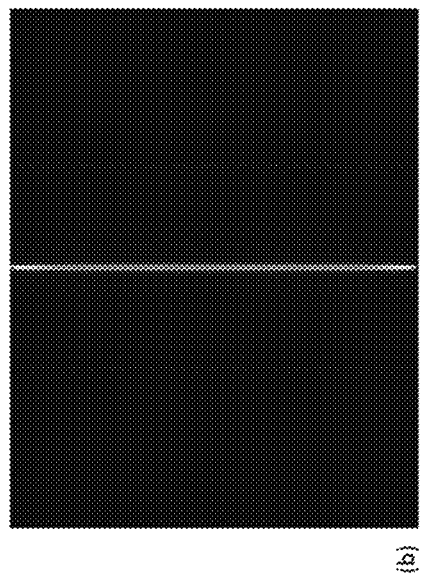
FIGS. 6A-6D show the calculated performance of Talbot spectrometers with different acceptance angles for collimated incident light.
Figure 6D:
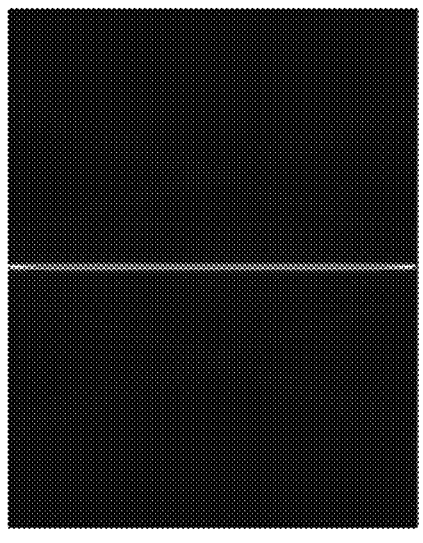
Figure 6A:
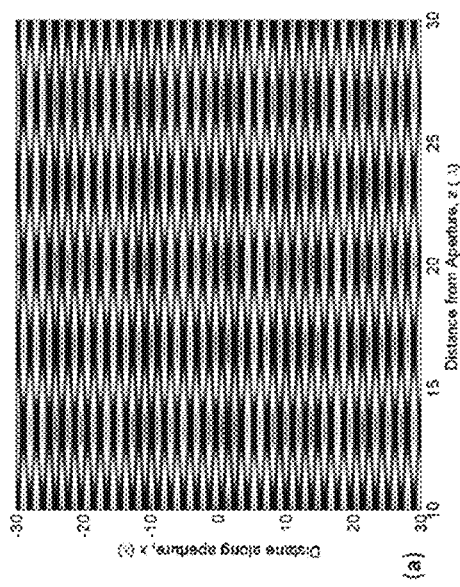
Figure 6C:
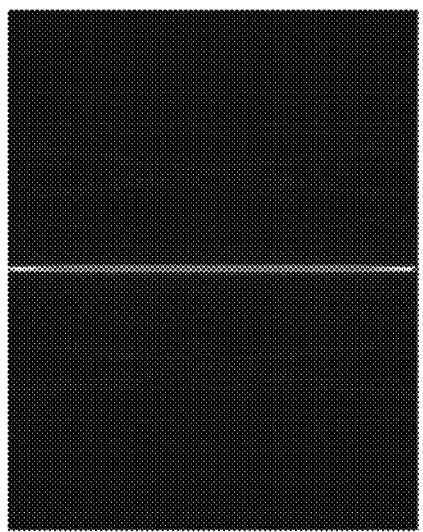

FIGS. 6A-6D show the calculated performance of Talbot spectrometers with different acceptance angles at about 2-5 degrees. FIG. 6A shows a zoomed-in image of the Talbot self-images for a grating with an acceptance angle of 10 degrees. At this level, no difference is immediately apparent by eye. FIGS. 6B to 6D show FFTs of the simulated diffraction pattern assuming 0 degree, 4 degree, and 10 degree acceptance angles.

Figures 7A, 7B:
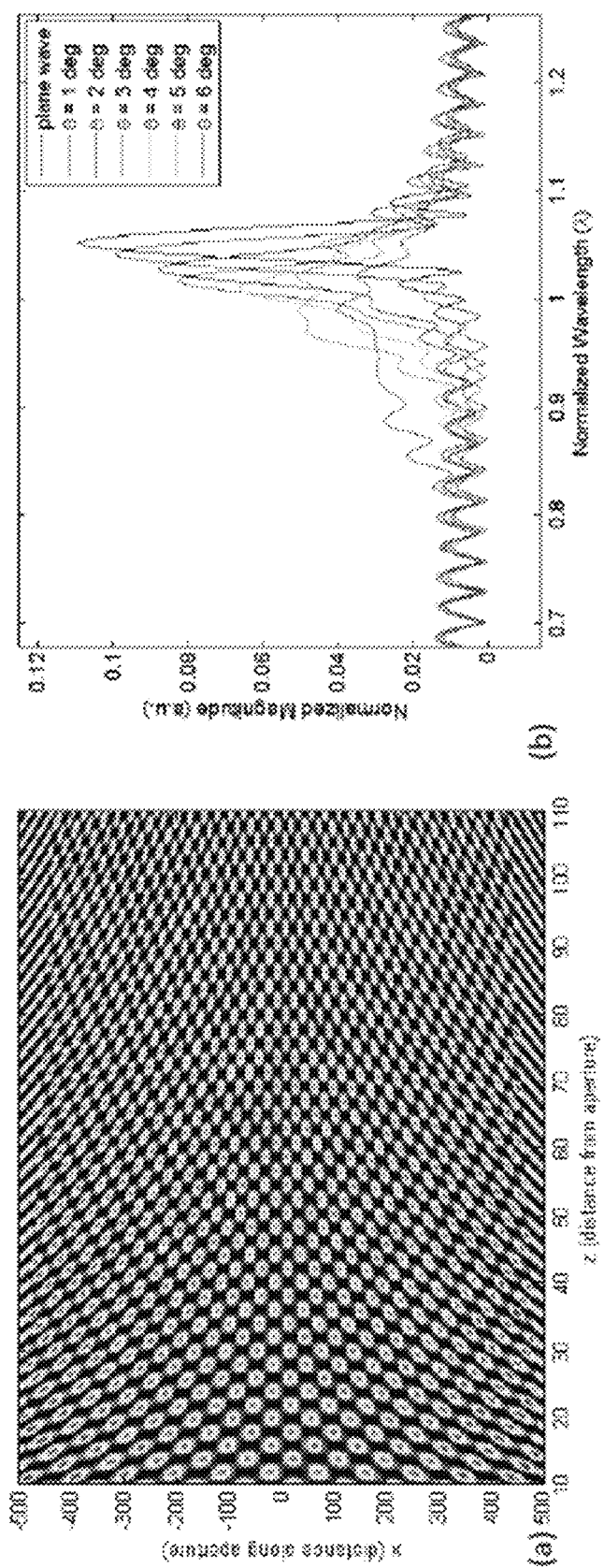
FIGS. 7A-7D show calculated resolution limits for a Talbot spectrometer with incident beams over a range of divergence angles.
Figure 7D:
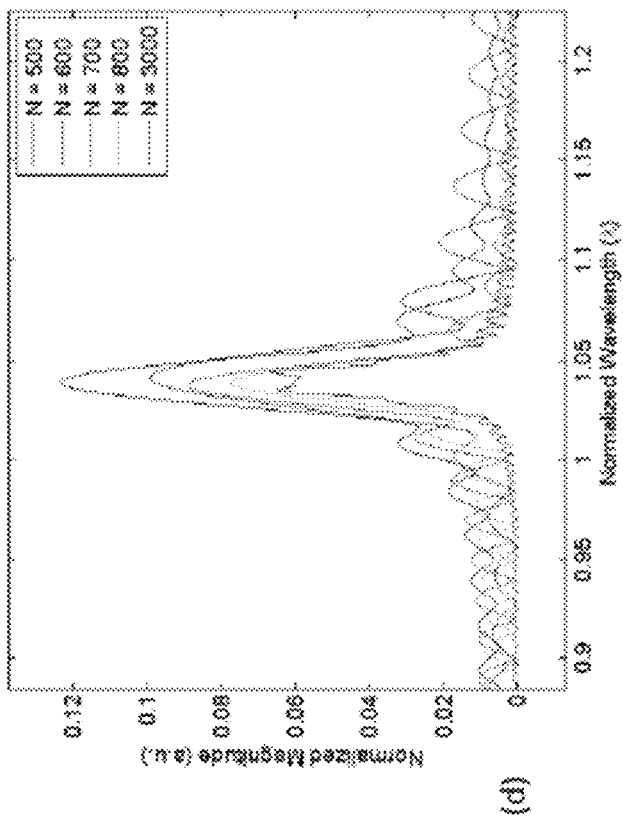
Figure 7C:
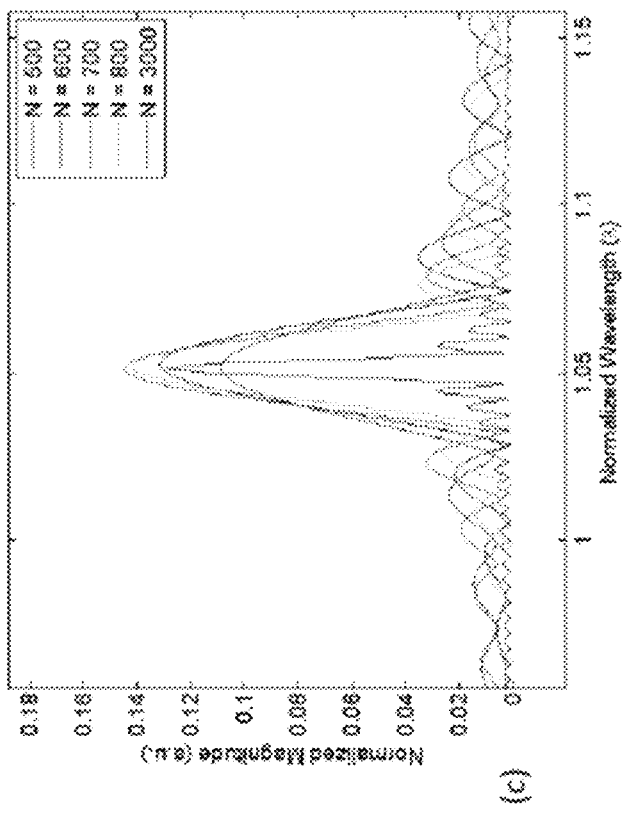

FIGS. 7A-7D show calculated resolution limits for non-collimated incident light beams having a divergence angle of about 2-5 degrees in Talbot spectrometers. FIG. 7A shows a zoomed-out image of the Talbot self-images for a grating with an acceptance angle of 10 degrees. Clear warping of the self-images is apparent. FIG. 7B shows resolution for a N=500 (i.e. the number of periods) grating with various acceptance angles. The data is taken from the Fourier transform of a single column of pixels near the center of the grating. FIG. 7C shows the limit of resolution as a function of grating and detector size. FIG. 7D shows the limit of resolution as a function of grating size. It shows that at some point, the resolution is no longer determined by the size of the grating but by the angle of acceptance instead.

From FIGS. 6A-6D and FIGS. 7A-7D, it can be seen that, in general, increasing the angle of acceptance can increase the breadth of the wavelength peak. In particular, the peak tends to be broadened out towards shorter wavelengths. The FFT images of the entire detector plane show that the response from a spherical wave is well-defined. Therefore, it may be possible to correct the images to remove the spherical phase front, and thereby reduce the peak width of the FFT signal.

Experimental Investigation of Talbot Spectrometers in Non-Paraxial Regime

Experimental investigation of Talbot spectrometers in non-paraxial regime uses two Talbot spectrometers. The first spectrometer includes a transmission phase grating with a grating period d=1.6077 microns (e.g., manufactured by Ibsen Photonics). The detector includes a monochrome CMOS imaging sensor (e.g., Aptina MT9P031) with pixel pitch p=2.2 microns. The detector has 2592×1944 pixels and an active imager size of 5.70 mm (H)×4.28 mm (V). On top of the detector is a microlens array and is protected by a glass window. The detector also includes a read-out board from The Imaging Source.

The second spectrometer uses a transmission grating with a grating period d=1.035 microns (e.g., also from Ibsen Photonics). The detector includes a monochrome CMOS imaging sensor (e.g., Aptina MT9J003) with pixel pitch p=1.67 microns. The detector has 3872×2764 pixels and an active imager size of 6.440 mm (H)×4.616 mm (V). As described above, the Talbot signal can be greatest for a grating with a period of 1.11 microns, and no Talbot signal may be detected for gratings with a period of 0.835 or 1.67 microns. This second spectrometer achieves sub-nanometer resolution as described below.

In both cases, a tunable Ti:Sapphire laser or a fixed wavelength laser is coupled to a single mode fiber, and the collimated output is passed through a 10× beam expander (e.g., a Thorlabs GBE10-B). The final collimated beam is more than 3 cm in diameter, and is normally incident on the grating. To ensure that the imaged area is in the Talbot zone, one edge of the imager is positioned to nearly touch the grating. The farthest point of the image sensor can be less than 6 mm from the top of the grating surface.

FIGS. 8A-8D illustrate the data processing of experimental results acquired using the first spectrometer. FIG. 8A shows the image taken from the detector at a wavelength of 818.20 nm. The detector is placed at 45 degree tilt with respect to the grating. The triangle in the upper left hand corner is the region where all 3 diffraction orders exist. It is also the region where the Talbot effect exists. FIG. 8B shows the result of 1D-FFT taken along each column of the detector (or row of the image as shown in FIG. 8A). The line corresponding to a wavelength of about 1300 nm appears in the top half of the image, where the Talbot self-images exist. FIG. 8C shows the mean of the 1D-FFT data across all the columns of the detector. FIG. 8D shows 2D-FFT of the image revealing an asymmetry in the frequency domain. Peak features in 2D-FFT image map onto 1D-FFT image.

As shown in FIGS. 8A-8D, analysis of the acquired Talbot images can include 1D FFT of each detector column, and then taking the mean of all the columns to reduce the noise in the 1D FFT signal. To convert the x-axis of the FFT data from $k_z$ to $\lambda$, Equation (13) can be used:

$$\lambda = \frac{2d^2(2\pi/k_z)}{d^2 + (2\pi/k_z)^2} \quad (13)$$

When taking the fast Fourier transform along each column of the image, peaks can be identified to correspond to the wavelength of the incident light. The resolution of the measured frequency increases with the angle of the detector, since the detector is able to sample more periods of the Talbot effect.

FIGS. 9A-9L show raw images, filters images after a bandpass filter, simulated images, and corresponding spectra using the second spectrometer (d=1.035 microns, p=1.67 microns) with the detector titled at different angles. FIGS. 9A-9D show the raw image (FIG. 9A), bandpass-filtered image (FIG. 9B), simulated image (FIG. 9C), and corresponding spectrum (FIG. 9D; acquired for a 100 column subsection) with the detector tilted at 6 degrees. FIGS. 9E-9H show the raw image (FIG. 9E), bandpass filtered image (FIG. 9F), simulated image (FIG. 9G), and corresponding spectrum (FIG. 9H) with the detector tilted at 12 degrees. FIGS. 9I-9L show the raw image (FIG. 9I), bandpass filtered image (FIG. 9J), simulated image (FIG. 9K), and corresponding spectrum (FIG. 9L) with the detector tilted at 21 degrees. The operating wavelength is 830.15 nm. The arrows point to the main peak. In the images, the x- and z-axes are along the rows and columns, respectively.

Figures 9A, 9B, 9C, 9D:
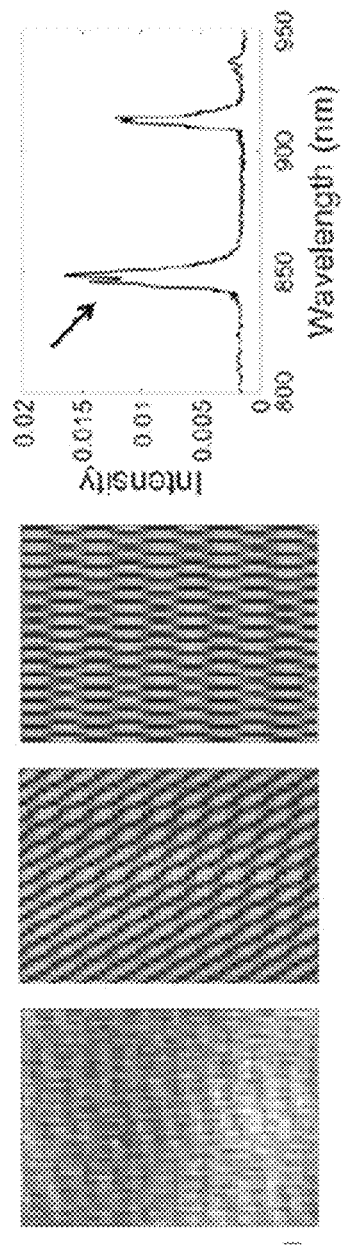
Figures 9E, 9F, 9G, 9H:
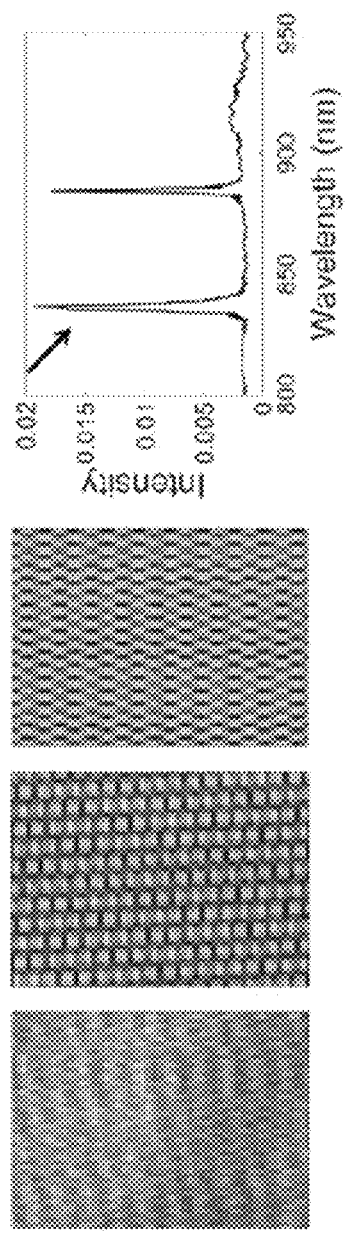

FIG. 9A, FIG. 9E, and FIG. 9I show the periodic pattern of the self-images in the raw images. After applying a simple band-pass filter to isolate the dominant frequency component in the 2D Fourier transform of the image, the self-images can be seen clearly in FIG. 9B, FIG. 9F, and FIG. 9J. The band-pass filter can remove the DC background component and spurious peaks that potentially arise from unwanted artifacts in the imager itself. All images shown are a 50 pixel by 50 pixel subsection of the entire image.

To obtain the spectra shown in FIG. 9D, FIG. 9H, and FIG. 9L, a 100 column subsection of the full-length image is used to carry out the Fourier transform. There are slight shifts in the center frequency of the peaks for different columns of the imager, which may be caused by the wavefront aberration of the input or the non-uniform microlens array across the imager for chief-ray angle correction for imaging application. The 1D FFT of the signal is taken along each detector column in the subsection, and then the mean of the magnitude of the FFTs is taken to reduce noise.

The experimental results in FIGS. 9A-9L are largely consistent with theoretical model. The spectra shown in FIG. 9D, FIG. 9H, and FIG. 9L each include two main peaks, which may be explained by the rotation of the imaged patterns in the experiments. The diffraction pattern is of the form cos(ax) cos(bz). Under rotation of the imager by a small angle $\phi$, the image of the field now exhibits two spatial frequencies in the z direction, $b(1-\phi)\pm a\phi$. Therefore, measuring the signal along the columns of the imager can produce a spectrum with two peaks near the expected wavelength. Without being bound by any particular theory or mode of operation, the rotated diffraction pattern could be caused by the possibility that the grating and imager are slightly rotated from each other in the x-y plane, such that the columns of the imager may not be perfectly parallel with the grooves of the grating.

The measured wavelengths in the spectra shown in FIG. 9D, FIG. 9H, and FIG. 9L are also slightly off the operating wavelength at 830.15 nm. This in part is due to the rotation of the observed diffraction pattern as discussed above, but may also because of the high sensitivity of the peak position to the angle of the incidence of the beam. Accurate detection of the wavelength can be achieved by calibrating the spectrometer, since the offset in predicted wavelength is constant for a set of measurements (see, e.g., FIG. 11).

The peaks themselves in FIG. 9D, FIG. 9H, and FIG. 9L also have small splitting for low camera tilt angles. This most likely is because the incident beam is not perfectly normal to the grating. Non-normal incidence in the x-direction can result in slightly different diffraction angles for the +1 and −1 beams, which would result in two slightly different $z_{SI}$ when they interfere with the $0^{th}$ diffracted beam. The +1 and −1 beams can also interfere with each other, but the periodicity in z will be much larger than $z_{SI}$, so it can be ignored. The relationship between the degree of peak splitting and the x-component of the wavevector, $k_x$, for small angle of incidence, is approximately:

$$1 \pm \frac{k_x k_g}{k^2 + k_g^2} = \frac{\lambda_\pm + \lambda_p(-1 + \sqrt{1 - \lambda_p^2/d^2})}{\lambda_\pm \sqrt{1 - \lambda_p^2/d^2}}, \quad (14)$$

where $k_g = 2\pi/d$ is the grating vector, $\lambda_p$ is the center wavelength, and $\lambda_\pm$ are the wavelengths of the two split peaks. For geometric reasons, $\theta_{det}$ affects whether this peak splitting is observed.

For small $\theta_{det}$, the imager can mostly sample the region where all three diffraction orders (−1, 0, 1) exist, so two $z_{SI}$ can be measured and peak splitting can be observed according to Equation (14). For large $\theta_{det}$, the imager can mostly sample regions where two of the three diffraction orders (±1, 0) exist. When using a subsection of the image, one $z_{SI}$ is measured and no peak splitting is observed. The small splitting of the peaks may limit the resolution that can be obtained. In FIG. 9D, the peaks are split by about 3 nm, which corresponds to an incidence angle of 0.03 degrees. However, one could address this issue by using a modified grating, or operating at a higher incidence angle for which only the 0 and 1 (or −1) diffraction orders exist. In one example, the grating can be modified to have very small diffraction for −1 order compared to +1 order (or to have very small diffraction for +1 order compared to −1 order). In another example, a large enough grating can be used to reduce the concern that all of the diffracted orders overlap simultaneously.

Figure 10:
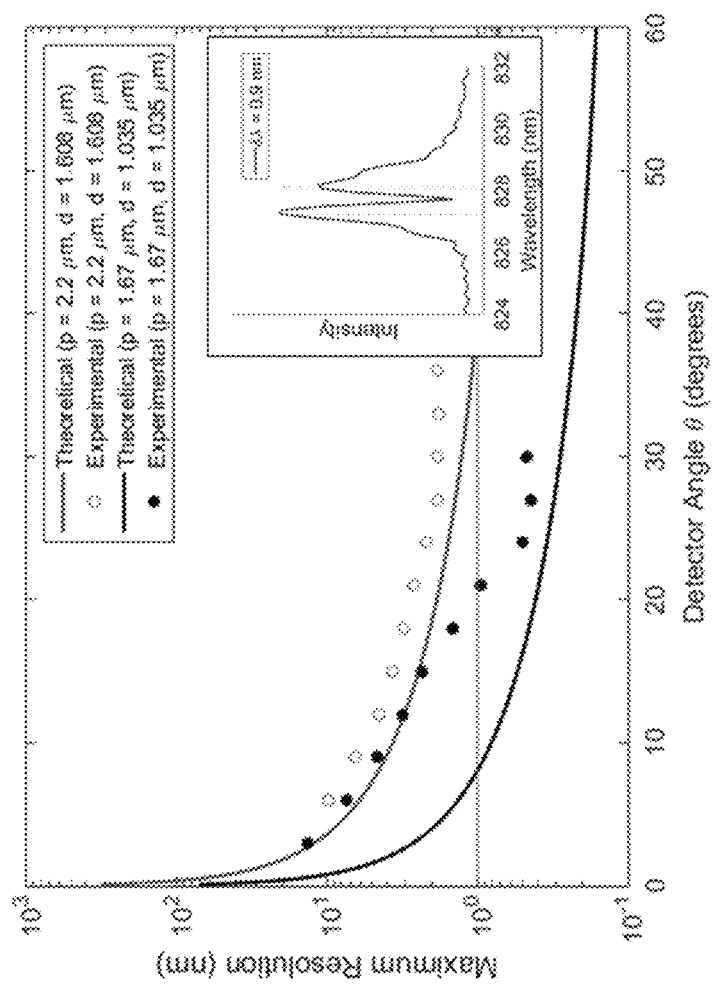
FIG. 10 shows calculated and experimental resolutions of a Talbot spectrometer as a function of the tilt angle between the detector and the grating.

FIG. 10 shows calculated and experimental resolutions of the Talbot spectrometers as a function of detector angle. Operating wavelength of 830.15 nm. The inset in FIG. 10 shows spectrum of two combined laser sources obtained using the second spectrometer system at $\theta_{det}$=20 degrees. The fixed-wavelength laser operates at 829.95 nm and the tunable is at 829.05 nm. The spectrometer can clearly resolve wavelengths that are 0.9 nm apart.

The resolution can be determined by finding the full-width half max (FWHM) of the peaks. As shown in FIG. 10, the spectrometer having the larger grating period shows an experimental resolution close to the theoretical resolution. The spectrometer with the smaller grating period shows the correct trend, but has a lower resolution than expected at low $\theta_{det}$ because of peak splitting.

FIG. 10 also shows that the spectrometers can simultaneously resolve light from two (mutually incoherent) lasers (see the inset in FIG. 10). A 50/50 fiber optic coupler is used to mix light from a fixed-wavelength diode laser operating at 829.95 nm with light from the tunable laser. The combined light is collimated and passed through the beam-expander.

Figures 11A, 11B:
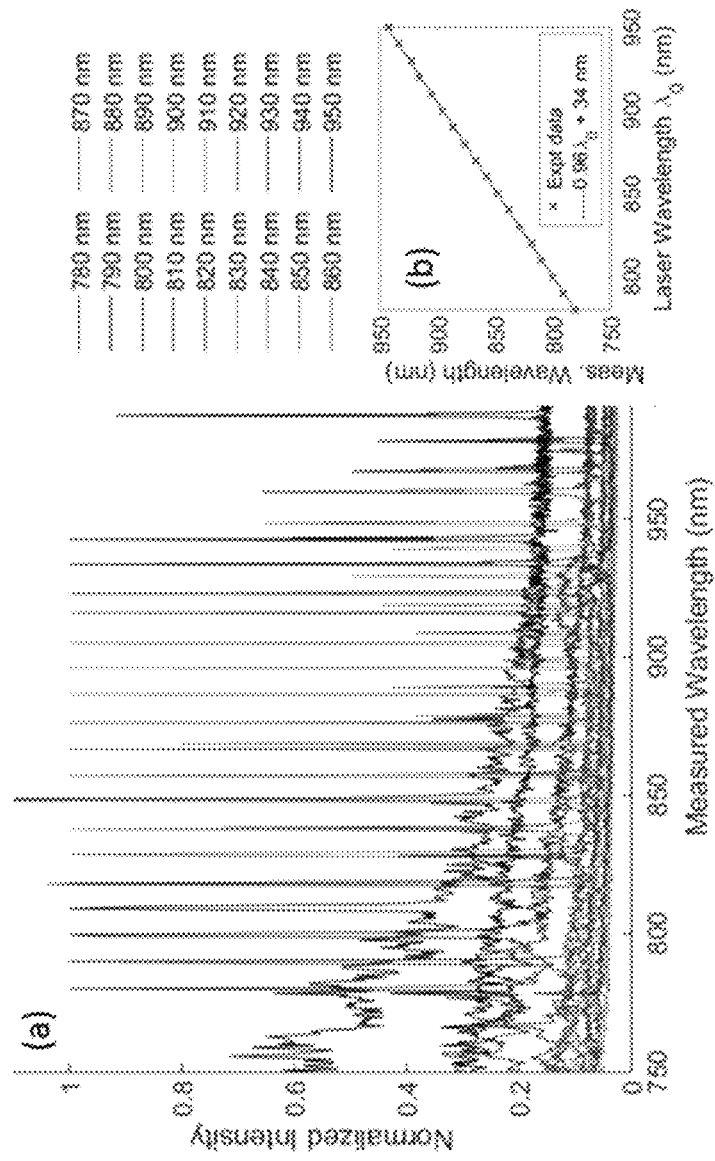
FIG. 11A shows spectra of a tunable laser source swept from 780 to 950 nm at a step size of 10 nm measured with a Talbot spectrometer.
FIG. 11B shows a plot illustrating a linear relation between measured wavelengths and the laser operating wavelengths shown in FIG. 11A.

FIG. 11A shows measured spectra as the laser is swept from 780 to 950 nm at a step size of 10 nm, obtained using spectrometer with grating period d of 1.035 microns, a pixel pitch of 1.67 microns, and a grating-to-sensor angle ($\theta_{det}$) at 20 degrees. Data is normalized to the bluer peak when the spectra show two peaks. FIG. 11B shows a plot illustrating a linear relation between the measured wavelength and actual laser wavelength.

In theory, the second spectrometer (d=1.035 microns, p=1.67 microns, $\theta_{det}$=20 degrees) can measure wavelengths from about 520 nm up to 1.03 microns. The lower bound can be the wavelength at which the second diffraction order begins to exist, and the upper bound can be the wavelength before which aliasing occurs. Experimental data shows that the second spectrometer can achieve an operating span of at least 170 nm (limited by the range of the Ti:Sapphire laser at shorter wavelengths and the sensitivity of the imager at longer wavelengths) and a resolution of less than 1 nm.

FIG. 11B shows that the relationship between the measured wavelength ($\lambda$) and laser wavelength ($\lambda_0$) is about $\lambda[nm]=0.96\lambda_0 [nm]+34 [nm]$. The background noise for the 950 nm line is noticeably high because of reduced sensitivity of the imager at longer wavelengths. The background noise for the 820 nm line is high because more signal power is in the spurious peak.

The experimental data described above shows that the non-paraxial Talbot effect can be used as the dispersion mechanism for building a compact spectrometer with high resolution. It can also be beneficial to investigate the influence of spatial incoherence on the resolution of such a spectrometer. Theoretical characterization can be performed using a light beam having an incidence angle spread over the polar and azimuthal directions on the grating for the Talbot spectrometer.

Figures 12A, 12B, 12C, 12D:
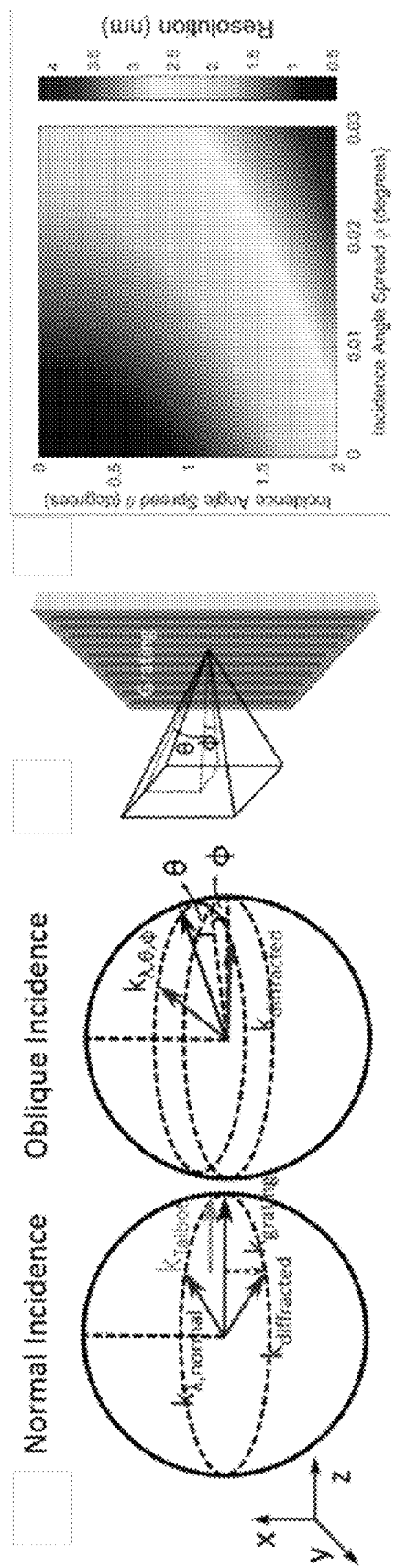
FIGS. 12A-12C illustrate a simulation model to investigate the influence of incoherence in the incident light beams on the resolution of Talbot spectrometers.
FIG. 12D shows calculated effective resolution as a function of θ spread and φ spread in Talbot spectrometers having a camera tilt angle of 30°.

FIGS. 12A-12C show the simulation model. FIG. 12A shows wave vector scattering due to grating under normal incidence, and FIG. 12B shows wave vector scattering due to grating under oblique incidence. FIG. 12C illustrates the incidence angle spread on the grating surface.

As seen in FIGS. 12A-12C, the Talbot wave vector $k_T$ arises due to the interference between the $+1^{st}$ and $-1^{st}$ order diffracted beams with the 0th order diffracted beam. An oblique incidence beam can result in a shift in the Talbot wave vector $k_T$ compared to the normal incidence case, and the shift depends on both $\theta$ (in the x-z plane) and $\varphi$ (in the y-z plane). If the incidence beam has an angular spread, the ensemble of the shift effectively may blur $k_T$ and reduce the resolution of the spectrometer. Due to the asymmetry of the wave vector deflection introduced by the grating, the effective resolution of the spectrometer suffers differently for $\theta$ spread and $\varphi$ spread.

FIG. 12D shows calculated effective resolution as a function of $\theta$ spread and $\varphi$ spread for a camera tilt angle of 30°. The resolution under normal incidence is below 0.5 nm at $\lambda$=830 nm. The plot suggests that in order to maintain the resolution around one nanometer in this ideal model, the angular spread $\theta$ can be restrained to be within around one degree and $\varphi$ to be within around one hundredths of a degree. This asymmetry of the dependence of effective resolution over $\theta$ spread and $\varphi$ spread for the Talbot spectrometer is similar to that of a conventional spectrometer, where the spectrometer resolution is more sensitive over the width direction of the slit than the length direction of the slit due to the asymmetric dispersion from 1D gratings.

In addition to high resolution, Talbot spectrometers described herein can also have a large étendue to measure most spectroscopic signals. Conventional spectrometers can have an étendue on the order of $10^{-4}$ to $10^{-3}$ mm². The two Talbot spectrometers described above can have an étendue of about $1.3\times10^{-4}$ mm², which is estimated using the second spectrometer with a 21 degree tilt angle and an acceptance angle tolerance of 0.007 degrees in the x-direction and 0.5 degrees in the y-direction for 1 nm resolution. This can be done by calculating the effect of non-normal incidence on $z_{ST}$. Therefore, it is expected that the Talbot spectrometers described herein can be used for most near infrared (NIR) sensing applications, given that the signal is first collimated.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for characterizing a tunable light source using the non-paraxial Talbot effect, the method comprising:
   generating a light beam by sweeping the tunable light source over a discrete set of operating wavelengths between a first wavelength and a second wavelength;
   transmitting the light beam through a grating to generate a plurality of Talbot images via the non-paraxial Talbot effect, the grating having a grating period from about 1 to about 2 times the second wavelength;
   detecting the plurality of Talbot images with a detector array tilted with respect to the grating; and
   estimating, for each operating wavelength, a corresponding measured wavelength of the light beam based at least in part on the plurality of Talbot images.

2. The method of claim 1, wherein the grating has a grating period from about 1 to about 1.2 times the second wavelength.

3. The method of claim 1, wherein estimating each measured wavelength comprises computing a Fourier transform of each Talbot image in the plurality of Talbot images acquired at the corresponding operating wavelength.

4. The method of claim 1, wherein detecting the plurality of Talbot images comprises:
   detecting a portion of a first Talbot image in the plurality of Talbot images at a first distance less than 1 mm from the grating with a proximal end of the detector array; and
   detecting a portion of a second Talbot image in the plurality of Talbot images at a second distance less than 10 mm from the grating with a distal end of the detector array.

5. The method of claim 1, wherein the detector array has a projected length at least three times greater than a Talbot length of the plurality of Talbot images.

6. The method of claim 1, wherein detecting the plurality of Talbot images comprises detecting the plurality of Talbot images with the detector array tilted at an angle of about 10 degrees to about 40 degrees with respect to the grating.

7. The method of claim 1, wherein each Talbot image in the plurality of Talbot images is a sinusoidal representation of the pattern.

8. A system, comprising:
   a tunable light source to generate a light beam swept over a discrete set of operating wavelengths between a first wavelength and a second wavelength;
   a grating, in optical communication with the tunable light source, to generate a plurality of Talbot images from the light beam via the non-paraxial Talbot effect, the grating having a grating period from about 1 to about 2 times the second wavelength;
   a detector array, tilted with respect to the grating, to detect the plurality of Talbot images; and
   a processor, operably coupled to the detector array, to estimate, for each operating wavelength, a corresponding measured wavelength of the light beam based at least in part on the plurality of Talbot images.

9. The system of claim 8, wherein the grating has a grating period from about 1 to about 1.2 times the second wavelength.

10. The system of claim 8, wherein the processor is configured to estimate each measured wavelength by computing a Fourier transform of each Talbot image in the plurality of Talbot images acquired at the corresponding operating wavelength.

11. The system of claim 8, wherein the detector array is configured to:
    detect a portion of a first Talbot image in the plurality of Talbot images at a first distance less than 1 mm from the grating with a proximal end of the detector array; and
    detect a portion of a second Talbot image in the plurality of Talbot images at a second distance less than 10 mm from the grating with a distal end of the detector array.

12. The system of claim 8, wherein the detector array has a projected length at least three times greater than a Talbot length of the plurality of Talbot images.

13. The system of claim 8, wherein the detector array is tilted at an angle of about 10 degrees to about 40 degrees with respect to the grating.

14. The system of claim 8, wherein each Talbot image in the plurality of Talbot images includes a sinusoid representation of a pattern of the grating.

15. A system for characterizing a tunable light source using the non-paraxial Talbot effect, comprising:
    the tunable light source to generate a light beam swept over a discrete set of operating wavelengths between about 520 nm and about 1.03 µm;
    a grating, in optical communication with the tunable light source, to generate a plurality of Talbot images from the light beam via the non-paraxial Talbot effect, the grating having a grating period from about 1030 nm to about 2060 nm;
    a detector array, tilted with respect to the grating at an angle from about 10 degrees to about 40 degrees, to detect the plurality of Talbot images at a spectral resolution of about 1 nm, each Talbot image in the plurality of Talbot images including a sinusoid representation of a pattern of the grating; and
    a processor, operably coupled to the detector array, to estimate, for each operating wavelength, a corresponding measured wavelength of the light beam by computing a Fourier transform of each Talbot image in the plurality of Talbot images acquired at that operating wavelength.

* * * * *